United States Patent [19]
Kirii et al.

[11] Patent Number: 5,687,598
[45] Date of Patent: Nov. 18, 1997

[54] PRESS HAVING CUSHIONING CYLINDERS EACH HAVING TWO CHAMBERS WHOSE PRESSURE DIFFERENCE IS ADJUSTABLE TO CONTROL BLANK-HOLDING FORCE

[75] Inventors: Kazunari Kirii, Aichi-ken; Norihisa Hirao, Okazaki, both of Japan

[73] Assignee: Toyota Jidosha Kabushiki Kaisha, Japan

[21] Appl. No.: 466,772

[22] Filed: Jun. 7, 1995

[30] Foreign Application Priority Data

Jul. 15, 1994 [JP] Japan ................... 6-163906

[51] Int. Cl.$^6$ .................................. B21D 24/08
[52] U.S. Cl. ........................... 72/21.5; 72/351
[58] Field of Search ............... 72/21.5, 350, 351, 72/453.13; 267/119

[56] References Cited

U.S. PATENT DOCUMENTS

| | | | |
|---|---|---|---|
| 1,844,250 | 2/1932 | Hawkins | 72/351 |
| 2,243,986 | 6/1941 | Stacy | 72/351 |
| 4,499,750 | 2/1985 | Gerber et al. | 72/351 |
| 4,592,220 | 6/1986 | Martinez et al. | 72/16 |
| 4,601,190 | 7/1986 | Schneider et al. | |
| 4,635,446 | 1/1987 | Meckler | 62/271 |
| 4,635,466 | 1/1987 | Seki et al. | 72/351 |
| 4,669,298 | 6/1987 | Kono et al. | 72/453.13 |
| 4,821,552 | 4/1989 | Baur et al. | 72/351 |
| 5,003,807 | 4/1991 | Terrell et al. | 72/351 |
| 5,295,383 | 3/1994 | Kirii et al. | |
| 5,299,444 | 4/1994 | Kirii et al. | |
| 5,339,665 | 8/1994 | Yoshikawa | 72/351 |
| 5,477,723 | 12/1995 | Kergen | 72/350 |

FOREIGN PATENT DOCUMENTS

| | | |
|---|---|---|
| 2046914 | 6/1991 | Canada. |
| 2077510 | 9/1992 | Canada. |
| 2077595 | 9/1992 | Canada. |
| 0173755 | 3/1986 | European Pat. Off. . |
| 0 312 809 | 4/1989 | European Pat. Off. . |
| 0 417 754 A2 | 3/1991 | European Pat. Off. . |
| 0 510 507 A1 | 10/1992 | European Pat. Off. . |
| 0531141 | 3/1993 | European Pat. Off. . |
| 0 596 696 A1 | 5/1994 | European Pat. Off. . |
| 4128973 | 4/1992 | Germany. |
| 93 19 500.1 | 3/1994 | Germany. |
| 55-97819 | 7/1980 | Japan. |
| 60-108429 | 7/1985 | Japan. |
| 61-190316 | 11/1986 | Japan. |
| 63535 | 3/1988 | Japan ................... 72/351 |
| 1-249227 | 10/1989 | Japan. |
| 5-57362 | 3/1993 | Japan. |
| 5-57363 | 3/1993 | Japan. |
| 5-69050 | 3/1993 | Japan. |
| 5-285556 | 11/1993 | Japan. |

Primary Examiner—Lowell A. Larson
Attorney, Agent, or Firm—Finnegan, Henderson, Farabow, Garrett & Dunner, L.L.P.

[57] ABSTRACT

A press wherein a blank-holding force generated by cushioning cylinders is transmitted to a pressure member through cushion pins for holding a blank during a pressing operation by a die and a punch, and is controllable by a pressure adjusting device according to an optimum pattern of control by controlling a difference between fluid pressures in two pressure chambers of each cushioning cylinder whose volumes decrease and increase, respectively, as the cushion pins are lowered.

9 Claims, 15 Drawing Sheets

PRESS HAVING CUSHIONING CYLINDERS EACH HAVING TWO CHAMBERS WHOSE PRESSURE DIFFERENCE IS ADJUSTABLE TO CONTROL BLANK-HOLDING FORCE

BACKGROUND OF THE INVENTION

1. Field of the Invention

The present invention relates in general to a press adapted to effect a drawing operation on a blank, and more particularly to improvements in a cushioning device operatively linked with a pressure member for holding the blank during the drawing operation.

2. Discussion of the Related Art

There is widely known a press of the type including (a) a movable die reciprocable in a vertical direction, (b) a stationary punch disposed below the movable die, and (c) a pressure member in the form of a pressure ring disposed inside the periphery of the punch so as to be movable in the vertical direction. The pressure ring cooperates with the die to hold a peripheral or outer portion of a blank while a drawing operation on the blank is effected by and between the die and the punch as the die is lowered. In this type of press, the pressure ring is supported by a cushioning device, which includes, for example, (x) a cushion pad which is biased in the upward direction by a cushioning air cylinder, (y) a plurality of balancing hydraulic cylinders which are disposed on the cushion pad and which have respective oil chambers communicating with each other, and (z) a plurality of cushion pins which are associated at their lower ends with the pistons of the respective balancing hydraulic cylinders and which support at their upper ends the pressure ring. An example of such a cushioning device is disclosed in laid-open Publication No. 60-108429 (published in 1985) of an unexamined Japanese Utility Model Application. In the cushioning device disclosed therein, a total blank-holding force acting on the blank is determined by the pressure in the cushioning air cylinder, and this blank-holding force is transmitted to the pressure ring through the cushion pad, balancing hydraulic cylinders and cushion pins, such that the hydraulic cylinders permit substantially even distribution of the blank-holding force to the cushion pins, which in turn assures substantially uniform or even distribution of the blank-holding force over the entire area of the supported portion of the blank, irrespective of dimensional errors or variations of the cushion pins and the other components of the cushioning device and the associated components. Described more specifically, the pressure in the hydraulic cylinders is determined according to a suitable equation or on the basis of test pressing results, depending upon the magnitude of the blank-holding force generated by the cushioning air cylinder, so that the pistons of the hydraulic cylinders which are pushed down by the cushion pins during a drawing operation are held between the upper and lower stroke ends, namely, are prevented from being bottomed during the drawing operation, even in the presence of some length variation of the cushion pins from the nominal value and/or some inclination of the cushion pad with respect to the horizontal plane.

Another type of cushioning device is disclosed in laid-open Publication No. 61-190316 (published in 1986) of unexamined Japanese Utility Model Application. This type of cushioning device includes an air cylinder and a hydraulic cylinder whose pistons are integrally connected in series with each other. In this cushioning device, the blank-holding force is generated based on a pressure of compressed air in the air cylinder, and a relief pressure of a relief valve connected to the hydraulic cylinder. The blank-holding force which acts on the blank under a drawing operation can be adjusted by changing the relief pressure of the relief valve. Therefore, the blank-holding force can be intricately controlled as the die is lowered or as the drawing operation progresses. The present cushioning device has various advantages. For example, the vibration of the device upon collision of the die with the pressure ring can be reduced to thereby prevent creasing of the blank due to inward movement thereof, so as to improve the surface quality of the product. Further, the blank-holding force can be reduced during the pressing cycle, to prevent rupture of the blank. This rupture prevention permits the use of the blank having a relatively low strength, that is, the use of a relatively inexpensive material as the blank.

However, the former cushioning device tends to be large-sized and extensive because of the provision of the cushioning air cylinder which biases the cushion pad in upward direction to generate the blank-holding force, and the provision of the plurality of balancing hydraulic cylinders disposed on the cushion pad for even distribution of the blank-holding force. Another drawback of this cushioning device is an undesirable change of the optimum pressure in the hydraulic cylinders with a change in the pressure in the cushioning air cylinder during a pressing cycle to change the blank-holding force. That is, if the blank-holding force is changed during the pressing cycle, the pressure of the balancing hydraulic cylinders may deviate from the optimum level that assures even distribution of the blank-holding force. While the blank-holding force may be temporarily changed during the pressing cycle by discharging the oil from the hydraulic cylinders, it is not easy to discharge the oil so as to change the blank-holding force according to a desired pattern for maintaining the even distribution of the blank-holding force. Although the hydraulic cylinders may be classified into different groups which are controlled independently of each other to change the local blank-holding forces by discharging the oil, this is not easy, either.

On the other hand, the latter cushioning device is capable of relatively easily changing the blank-holding force according to a desired pattern during a pressing cycle. However, the dimensional and other errors or variations of the related components may cause uneven distribution of the blank-holding force, leading to deteriorated quality of the product. Further, this cushioning device cannot change the local blank-holding forces corresponding to respective areas of the pressure ring.

SUMMARY OF THE INVENTION

The present invention was developed in view of the prior art discussed above. It is therefore an object of the invention to provide a simple, inexpensive press which permits the blank-holding force to be changed according to a desired pattern during a pressing cycle and which assures desired distribution (e.g., even distribution or predetermined uneven distribution) of the blank-holding force irrespective of dimensional and other errors or variations of the related components.

According to the principle of the present invention, there is provided a press having (a) a vertically reciprocable die, (b) a stationary punch disposed below the die, and (c) a pressure member disposed adjacent the punch such that the pressure member is vertically movable relative to the punch, the die and the punch cooperating with each other to perform a pressing operation on a blank placed on the pressure member as the die is lowered relative to the punch while the blank is held by and between the die and the pressure member, the press comprising: (d) a plurality of cushion pins which support at upper ends thereof the pressure ring; (e) a plurality of cushioning cylinders associated with lower ends of the cushion pins and having pistons which are movable over a distance larger than an operating stroke of the pressure ring during the pressing operation, each of the cushioning cylinder having a first pressure chamber and a second pressure chamber whose volumes decrease and increase, respectively, as the cushion pins are lowered, the first and second pressure chambers having a first and a second fluid pressure, the cushioning cylinders generating a blank-holding force which varies with a difference between the first and second fluid pressures, the blank-holding force being transmitted to the pressure ring through the cushion pins to hold the blank; and (f) pressure adjusting means for controlling at least one of the first and second fluid pressures according to a predetermined optimum pattern of control of the blank-holding force as the pressure ring is lowered during the pressing operation.

In the press of the present invention constructed as described above, the cushioning cylinders whose pistons are movable over the distance larger than the operating stroke of the pressure member during a pressing cycle are disposed below and associated with the cushion pins which support the pressure member, so that the blank-holding force generated as a function of the fluid pressure difference of the first and second pressure chambers of the cushioning cylinders is transmitted to the pressure member to hold the blank. The first fluid pressure in the first pressure chamber and/or the second fluid pressure in the second pressure chamber is/are controlled by the pressure adjusting means according to the predetermined pattern, to control the fluid pressure difference for thereby controlling the blank-holding force according to the optimum pattern as the pressure member is lowered during the pressing cycle. The pressure adjusting means may be adapted to change the blank-holding force according to a predetermined optimum pattern of change as the pressure ring is lowered. Alternatively, the pressure adjusting means may be adapted to maintain the blank-holding force at a predetermined constant value throughout the movement of the pressure member. Where the blank-holding force is changed with the downward movement of the pressure member, the pressure adjusting means should be operated in synchronization with the pressing operation, namely, depending upon the position of the die or pressure member as detected by suitable position detecting means such as a rotary encoder for detecting the rotating angle of a crankshaft of a drive device for reciprocating the die, or limit switches or proximity switches for directly detecting predetermined positions of the die.

If the first pressure chambers of the cushioning cylinders communicate with each other while the second pressure chambers of the cushioning cylinders communicate with each other, the cushioning cylinders have the same difference of the first and second fluid pressures, and the cushion pins receive the same forces from the cushioning cylinders, whereby the blank-holding force is evenly or uniformly distributed over the entire area of the pressure member, even if the cushioning cylinders have different piston positions due to a length variation of the cushion pins, for example. However, the even distribution of the blank-holding force is also possible even where the cushioning cylinders are independent of each other and controlled independently of each other by the pressure adjusting means. In this latter case, the cushioning cylinders should be controlled according to the same pattern. Further, the distribution of the blank-holding force may be positively made uneven for different areas or sections of the pressure ring or for the different cushioning cylinders. Described more specifically, the cushioning cylinders are classified into two or more groups which correspond respective different sections of the pressure member, depending upon the specific condition of the pressing operation such as the specific configuration of the product to be manufactured by the press. The cushioning cylinders of the same group are controlled by the pressure adjusting means according to the same pattern of control of the blank-holding force, but the cushioning cylinders of the different groups are controlled according to different patterns of control of the blank-holding force. Similarly, the different cushioning cylinders corresponding to different local positions of the pressure member may be controlled differently depending upon the pressing conditions at the local positions of the pressure member. It is noted that the distribution of the blank-holding force on the pressure member or blank is influenced by not only the distribution of the forces generated by the individual cushioning cylinders, but also the number of the cushioning cylinders and their positions with respect to the pressure member.

While the pressure adjusting means may be designed to control both the first and second fluid pressures in the first and second pressure chambers of each cushioning cylinder whose volume decrease and increase, respectively, as the cushion pins are lowered, the force which is generated by each cushioning cylinder and acts on the corresponding cushion pin may be controlled by controlling one of the first and second fluid pressures of each cushioning cylinder. In this case, the pressure chamber whose fluid pressure is not controlled may be open or exposed to the atmosphere or completely enclosed. Where the non-controlled pressure chamber is enclosed, the fluid pressure in that pressure chamber changes with the movement of the cushion pin, and therefore the pressure adjusting means is desirably arranged to control the fluid pressure in the other or controlled pressure chamber while taking into account the fluid pressure change in the non-controlled pressure chamber. The non-controlled pressure chamber may be connected to an accumulator, or to a volume compensating cylinder whose volume change so as to offset the volume change of the controlled pressure chamber as the pressure member is moved. If the non-controlled pressure chamber is filled with an oil or other liquid having a large modulus of elasticity of volume, in particular, the non-controlled pressure chamber need to be connected to such an accumulator or volume compensating cylinder. It is also noted that the volume of the pressure chamber controlled by the pressure adjusting means also changes with the movement of the pressure member, and therefore the controlled pressure chamber need to be connected to a similar volume compensating cylinder, or the change of the fluid pressure in the controlled pressure chamber due to its volume change should be taken into account to control the pressure in the controlled pressure chamber. The cushioning cylinders may be adapted such that the pistons are moved relative to the stationary cylinder housings, or the cylinder housings are moved relative to the stationary pistons.

In the case where the individual cushioning cylinders are controlled independently of each other and the non-controlled pressure chambers of the cushioning cylinders are completely enclosed, the non-controlled pressure chambers have different fluid pressures due to different piston positions during the pressing operation due to length variation of the cushion pins. Therefore, the cushioning cylinders generate different forces even if the fluid pressures in the controlled pressure chambers are controlled to be equal to each other. Where the non-controlled pressure chambers are filled with a gaseous fluid having a small modulus of elasticity of volume, however, the amount of variation in the fluid pressures in the non-controlled pressure chambers due to the different piston positions is small, and the cushioning cylinders have a considerably smaller variation in the cushioning forces generated than the balancing hydraulic cylinders mounted on the cushion pad in the cushioning device disclosed in the laid-open Publication No. 60-108429 identified above. The present invention may be embodied in this form wherein the non-controlled pressure chambers are filled with a gaseous fluid.

The pressure adjusting means may include means for defining a fluid-filled space communicating with the controlled pressure chamber or chambers of the cushioning cylinder or cylinders, a pump for feeding a fluid into the fluid-filled space to increase the fluid pressure in the fluid-filled space and thereby increase the fluid pressure in the controlled pressure chamber or chambers, and a shut-off valve which is opened to discharge the fluid from the fluid-filled space to reduce the fluid pressure in the fluid-filled space for thereby reducing the fluid pressure in the controlled pressure chamber or chambers. Alternatively, the pressure adjusting means may include the fluid-filled space as described above, and means for changing the volume of the fluid-filled space to change the fluid pressure in the fluid-filled space for thereby changing the fluid pressure in the controlled pressure chamber or chambers of the cushioning cylinder or cylinders.

As discussed above, the press of the present invention is capable of controlling the blank-holding force during a pressing cycle according to a desired pattern, such that the blank-holding force is evenly distributed irrespective of dimensional or other error or variation of the associated components, or unevenly for different sections of the pressure member or blank. Accordingly, the quality of the product obtained as a result of the pressing operation is improved, and a comparatively inexpensive low-quality material can be used as the blank. Moreover, the cushioning mechanism for generating and controlling the blank-holding force on the present press consists of only the plurality of cushioning cylinders corresponding to the cushion pins, and the pressure adjusting cylinders for controlling the fluid pressure difference of the two pressure chambers of the cushioning cylinders. The cushioning mechanism is therefore simpler in construction and less expensive than the conventional cushioning mechanism which uses a cushioning air cylinder, and balancing hydraulic cylinders separate from the air cylinder, as described above.

In one preferred form of this invention, the first pressure chambers of at least two cylinders of the cushioning cylinders communicate with each other, while the second pressure chambers of at least two cylinders of the cushioning cylinders communicate with each other.

In the above form of the invention wherein the first pressure chambers of the selected cushioning cylinders communicate with each other while the second pressure chambers of those cushioning cylinders communicate with each other, the pressure adjusting means is connected to a fluid circuit which includes the selected cushioning cylinders. In this form of the invention, the selected cushioning cylinders have the same fluid pressure difference and therefore generate the same force acting on the corresponding cushion pins, even if those cushioning cylinders have different piston positions during the pressing cycle due to length variation of the cushion pins and other dimensional or positional errors or variations of the related components. This arrangement therefore assures a higher degree of evenness of distribution of the blank-holding force over the entire area of the pressure member corresponding to the selected or mutually communicating cushioning cylinders, than an arrangement in which the fluid pressure differences of the individual cushioning cylinders are controlled by the pressure adjusting means independently of each other. Further, the cushioning mechanism can be simplified and less expensive since the single pressure adjusting means is necessary.

In the case where the pressure chambers of all of the cushioning cylinders communicate with each other, the blank-holding force can be distributed completely evenly over the entire area of the pressure member. However, the blank-holding force may be positively or purposely made uneven, by suitably grouping the cushioning cylinders and controlling the different groups of cushioning cylinders according to different patterns of control of the blank-holding force. More specifically explained, the cushioning cylinders are grouped depending upon the pressing condition such as the configuration of the product to be manufactured, and the cushioning cylinders of the same group communicate with each other. The cushioning cylinders of the different groups are controlled independently of each other, so that the different groups generate different local blank-holding forces corresponding to the local sections of the pressure member. In this case, each group of cushioning cylinders is connected to the corresponding one of a plurality of pressure adjusting means. Namely, the number of the pressure adjusting means is the same as the number of the groups of the cushioning cylinders.

In a second preferred form of the invention, the first pressure chambers of the cushioning cylinders are filled with a gas, while the second pressure chambers of the cushioning cylinders are filled with an oil, and the pressure adjusting means controlling pressures of the oil in the second pressure chambers, as the second fluid pressure.

In the above form of the invention, the first pressure chambers of the cushioning cylinders whose volumes decrease as the cushion pins are lowered are filled with a gas such as nitrogen gas. On the other hand, the second pressure chambers whose volumes increase with the downward movement of the cushion pins are filled with an oil. The pressure adjusting means is adapted to control the pressure of the oil in the second pressure chamber of each cushioning cylinder, to thereby control the difference between the pressures of the gas and oil in the first and second pressure chambers, whereby the forces which act on the individual cushion pins are controlled according to the predetermined optimum pattern of control. In this case, the blank-holding force is based on the pressure of the gas in the first pressure chamber, which increases with a decrease in the volume as the cushion pin is lowered. Since the pressure adjusting means controls the pressure of the oil in the second pressure chamber to control or adjust the pressure difference of the first and second pressure chambers, the blank-holding force can be controlled with higher accuracy according to the predetermined pattern even when the pressing operation is effected at a comparatively high speed, than in the case where the pressure of the gas which has a comparatively low modulus of elasticity of volume is controlled to adjust the blank-holding force. Further, the blank-holding force can be suitably controlled while the oil pressure to be controlled is maintained within a range between comparatively low levels, the oil pressure can be easily controlled without a risk of oil leakage. To control the oil pressure in the second fluid chamber, the oil should be fed into and discharged from the second fluid chamber. To this end, the pressure adjusting means may use a suitable cylinder connected to the second fluid chamber, for example. When the die is lowered, the piston of the cushioning cylinder is forcibly lowered by the cushion pin, and the oil is fed into the second pressure chamber whose volume increases as the piston is lowered. When the die is elevated, the piston is elevated at a sufficiently high rate by the gas pressure in the first pressure chamber which has been increased by the downward movement of the piston, while the oil is discharged from the second pressure chamber as the volume of the second pressure chamber is reduced. Thus, the pressing operation can be performed at a comparatively high speed with a fast reciprocation of the pressure member.

In one advantageous arrangement of the above form of the invention wherein the blank-holding force is generated by the gas pressure in the first pressure chambers of the cushioning cylinders, each cushioning cylinder includes (e-1) a cylinder housing having a plurality of piston chambers arranged in an axial direction thereof, and (e-2) a plurality of pistons which are slidably received in the respective piston chambers and which are connected to each other by a piston rod for movement in the axial direction as a unit. This arrangement permits a large total pressure receiving area of the pistons and provides an accordingly large blank-holding force while maintaining a relatively small diameter of the cylinder housing. Accordingly, the required space for installation of each cushioning cylinder is reduced while assuring the desired total blank-holding force, and the reduced installation space enables a large number of the cushioning cylinders to be installed for intricate control of distribution of the blank-holding force.

While the first and second pressure chambers of each gas cylinder are filled with a gas and an oil according to the above second preferred form of the invention, the cushioning cylinders may have the other configurations as indicated in TABLE 1 below.

TABLE 1

| Configuration No. | 1 | 2 | 3 | 4 | 5 | 6 | 7 |
|---|---|---|---|---|---|---|---|
| 1st Pressure Chamber | Gas | Gas | Open | Oil | Oil | Oil | Open |
| 2nd Pressure Chamber | Gas | Open | Gas | Oil | Gas | Open | Oil |

In the above table, "Open" means that the pressure chamber is open to the atmosphere. In the Configuration Nos. 1–3 wherein only a gas is used, the response of the pressure adjustment by the pressure adjusting means is relatively low, and the pressing speed is accordingly limited. The Configuration Nos. 4–6 wherein the first pressure chamber is filled with an oil require a hydraulic circuit for feeding the oil into the first pressure chamber as the die is elevated toward its upper stroke end. In the Configuration Nos. 3 and 7 wherein the first pressure chamber is open to the atmosphere, the blank-holding force is generated by a reduced or negative pressure (lower than the atmospheric pressure) in the second pressure chamber. Therefore, the cushioning cylinders tend to suffer from insufficiency of the blank-holding force and easy entry of the air into the second pressure chambers. The blank-holding force may be obtained by the negative pressure in the second pressure chamber even where the first pressure chamber is filled with a fluid.

In a third preferred form of this invention, said pressure adjusting means comprises: (f-1) a pressure adjusting cylinder having a piston, and a pressure regulating chamber which is partially defined by the piston and which communicates with at least one of the first and second pressure chambers corresponding to the above-indicated at least one of the first and second fluid pressures which is controlled according to the predetermined pattern of control; (f-2) load detecting means for detecting the blank-holding force during the pressing operation; (f-3) calculating means for obtaining a difference between the blank-holding force detected by the load detecting means and an optimum value as represented by the predetermined optimum pattern of control, and calculating an amount of change of a volume of the pressure regulating chamber necessary to change the blank-holding force by an amount equal to the obtained difference; and (f-4) piston drive means for moving the piston of the pressure adjusting cylinder so as to change the volume of the pressure regulating cheer by the amount of change of the volume calculated by the calculating means.

In the above third preferred form of this invention, the pressure regulating chamber of the pressure adjusting cylinder communicates with at least one of the first and second pressure chambers of the cushioning cylinders which corresponds to at least one of the first and second fluid pressures to be controlled according to the predetermined pattern of control. Further, the calculating means calculates the amount of change of the volume of the pressure regulating cheer which is necessary to change the blank-holding force by an amount equal to the difference between the actual blank-holding force detected by the load detecting means and the optimum value as represented by the optimum pattern of control of the blank-holding force. The piston of the pressure adjusting cylinder is moved by the piston drive means by a distance necessary to change the volume of the pressure regulating chamber by the amount of change of the volume calculated by the calculating means. As a result, the actual blank-holding force as detected by the load detecting means is controlled to be substantially equal to the optimum value according to the predetermined optimum pattern of control. Thus, the difference between the actual and optimum blank-holding force values is converted into the amount of change of the volume of the pressure regulating chamber, so that the piston of the pressure adjusting cylinder is moved so as to change the volume of the pressure regulating chamber by the obtained amount of change, for thereby controlling or adjusting the first fluid pressure and/or the second fluid pressure of the cushioning cylinders. This arrangement assures higher degrees of response and control accuracy of the actual blank-holding force, than an arrangement in which the fluid pressure or pressures of the cushioning cylinders or the position of the piston of the pressure regulating cylinder is/are controlled in a feedback manner so as to zero the above-indicated difference of the actual and optimum blank-holding force values. Where the fluid in the cushioning cylinders whose pressure is controlled is an oil or other liquid, a small distance of movement of the piston of the pressure adjusting cylinder provides a relatively large amount and a relatively high rate of change of the fluid pressure in the cushioning cylinders.

The load detecting means may include a load sensor such as a strain gage attached to a plunger for reciprocating the die or to the cushion pin or pins, which load sensor directly detects a load acting on the plunger or cushion pins, as the blank-holding force. However, the load detecting means may include pressure sensors for detecting the first and second fluid pressures in the first and second pressure chambers, for example, and means for calculating load values by multiplying the detected first and second fluid pressures by the pressure receiving areas of the first and second fluid chambers, respectively, and calculating the blank-holding force by subtracting the load value of the second fluid chamber from the load value of the first fluid chamber.

While the calculating means of the pressure adjusting means is basically adapted to obtain the amount of change of the volume of the pressure regulating chamber which corresponds to the difference of the actual and optimum blank-holding force values, the calculating means may be adapted to obtain an amount of displacement or movement of the piston of the pressure regulating cylinder by dividing the obtained amount of change of the volume by the cross sectional area of the pressure regulating chamber, in the case where the piston drive means includes a mechanism such as a feed screw mechanism or a linear motor for directly moving the piston of the pressure regulating cylinder in the axial direction.

Although the above third preferred form of the invention is adapted to move the piston of the pressure adjusting cylinder so that the detected actual blank-holding force coincides with the optimum value of the predetermined pattern of change of the blank-holding force, the piston may be moved by a can or linear drive means which is controlled according to a predetermined pattern corresponding to the predetermined optimum pattern of change of the blank-holding force.

In a first advantageous arrangement of the above third preferred form of the present invention, the first pressure chambers of the cushioning cylinders are filled with a gas, while the second pressure chambers of the cushioning cylinders are filled with an oil, and the pressure adjusting means is adapted to control pressures of the oil in the second pressure chambers, as the second fluid pressure. In this arrangement, the load detecting means (f-2) includes a gas pressure sensor (f-2-1) for detecting a gas pressure Pg in the first pressure chambers, and an oil pressure sensor (f-2-2) for detecting an oil pressure Po in the second pressure chambers, and the pressure adjusting means further comprises pressure-receiving area determining means (f-5) for determining a first pressure-receiving area Sg of a piston of each of the cushioning cylinders which receives the gas pressure and a second pressure-receiving area So of the piston of the each cushioning cylinder which receives the oil pressure. The pressure-receiving area determining means includes a load sensor for detecting a load which acts on the press during a test pressing operation, and determines the first and second pressure-receiving areas according to a predetermined relationship between the load detected by the load sensor during the test pressing operation and the gas and oil pressures detected by the gas and oil pressure sensors during the test pressing operation. The determined first and second pressure-receiving areas are stored in a suitable memory. The load detecting means is adapted to calculate the blank-holding force on the basis of the gas and oil pressures detected during the pressing operation on the blank, and the first and second pressure-receiving areas stored in the memory.

In the above arrangement, the first and second pressure chambers of the cushioning cylinders are filled with the gas and oil, respectively, and the oil pressure Po in the second pressure chambers is controlled by the pressure adjusting means. The load detecting means calculates the blank-holding force on the basis of the gas and oil pressures Pg, Po detected by the respective gas and oil pressure sensors, and on the basis of the predetermined first and second pressure-receiving areas Sg, So of the pistons of the cushioning cylinders which are determined by the pressure-receiving area determining means according to the predetermined relationship between the load detected by the load sensor during the test pressing operation and the gas and oil pressures detected during the test pressing operation. Since the load and the gas and oil pressures used to determine the pressure-receiving areas are detected during the test pressing operation, the first and second pressure-receiving areas used to calculate the blank-holding force during the actual pressing operation on the blank reflect a gas leakage and/or an oil leakage from the cushioning cylinders, and detecting errors of the gas and oil pressure sensors, if such leakage and/or detecting errors exists (exist). This arrangement assures a higher degree of accuracy of detection or calculation of the blank-holding force by the load detecting means, than an arrangement which uses the nominal design values or actually detected values of the pressure-receiving areas.

The test pressing operation to determine the pressure-receiving areas Sg, So of the cushioning cylinders is effected prior to the actual pressing operation on the blank. In this case, the load acting on the press is detected by the load sensor attached to a suitable load measuring block installed in place of the pressure member such that the load measuring block is supported by the cushion pins. During the test pressing operation, the press slide is reciprocated to move the piston of each cushioning cylinder, and the load is detected on the basis of the output of the load sensor. The load sensor may preferably use a strain gage adapted to convert a strain of a suitable load-receiving member into a load value.

In a second advantageous arrangement of the above third preferred form of the present invention, the first pressure chambers of the cushioning cylinders are filled with a gas, while the second pressure chambers of the cushioning cylinders are filled with an oil, and the pressure adjusting means is adapted to control pressures of the oil in the second pressure chambers, as the second fluid pressure. In this arrangement, the pressure adjusting cylinder of the pressure adjusting means has a pilot chamber which is filled with an oil and which is partially defined by the piston and separated from the pressure regulating chamber by the piston, and the piston drive means includes a pressure regulating device for controlling flows of the oil into and from the pilot chamber, to thereby move the piston for changing the volume of the pressure regulating chamber. According to the present arrangement, the press further comprises: (g) an oil pressure sensor for detecting a pressure of the oil in the pilot chamber or the pressure regulating chamber; (h) initial pressure adjusting means for adjusting the pressure regulating device, prior to the pressing operation on the blank, such that the pressure of the oil detected by the oil pressure sensor is equal to a predetermined optimum value; (i) a piston position sensor for detecting a position of the piston of the pressure adjusting cylinder; and (j) oil leakage detecting means for detecting a leakage flow of the oil from a hydraulic circuit including the second pressure chambers of the cushioning cylinders, by determining whether the position of the piston detected by the piston position sensor substantially coincides with a predetermined initial position, while the pressure of the oil detected by the oil pressure sensor is adjusted to the predetermined optimum value by the initial pressure adjusting means.

In this second advantageous arrangement, the first and second pressure chambers of the cushioning cylinders are filled with a gas and an oil, respectively, and the oil pressure in the second pressure chambers is controlled by the pressure adjusting means, as in the first advantageous arrangement. In this second arrangement, the pressure adjusting cylinder also has a pilot chamber which is separated from the pressure regulating chamber by the piston. The pressure regulating device of the piston drive means is adapted to control the oil flows into and from the pilot chamber of the pressure adjusting cylinder of the pressure adjusting means, so that the piston of the pressure adjusting cylinder is moved to change the volume of the pressure regulating chamber for thereby controlling the oil pressure in the second pressure chambers. Prior to the pressing operation on the blank, the oil pressure in the pilot chamber or pressure regulating chamber is detected by the oil pressure sensor, and the pressure regulating device is controlled by the initial pressure adjusting means so that the oil pressure detected by the oil pressure sensor is equal to the predetermined initial value. In this condition, the oil leakage detecting means operates to check if the hydraulic circuit associated with the second pressure chambers of the cushioning cylinders has an oil leakage, by determining whether the piston of the pressure adjusting cylinder is located substantially at the initial position. In this respect, the piston of the pressure adjusting cylinder is moved such that a thrust force based on the oil pressure in the pilot chamber counterbalances a thrust force based on the oil pressure in the pressure regulating chamber. After the pressure regulating device has been controlled by the initial pressure adjusting means, therefore, the piston of the pressure adjusting cylinder should be located at the initial position in the absence of oil leakage from the hydraulic circuit associated with the second pressure chambers of the cushioning cylinders. If the piston of the pressure adjusting cylinder is not located at the initial position, this is an indication of the presence of an oil leakage from the hydraulic circuit. In the presence of the oil leakage, the initial volume of the oil in the hydraulic circuit differs from the nominal value, and the relationship between the amounts of change of the volume and the oil pressure of the pressure adjusting cylinder differs from the nominal relationship, whereby the blank-holding force cannot be suitably controlled according to the predetermined optimum pattern by the pressure adjusting means even if the volume of the pressure regulating chamber is changed by the amount of change calculated by the calculating means indicated above.

In the light of the above drawback, the present second advantageous arrangement of the third preferred form of the present invention uses the oil leakage detecting means for diagnosing the hydraulic circuit including the second pressure chambers of the cushioning cylinders, to detect an oil leakage from the hydraulic circuit, prior to the production run of the press. This arrangement is effective to avoid an erroneous adjustment of the blank-holding force due to a variation in the initial volume of the oil in the hydraulic circuit.

In the above second advantageous arrangement, the oil leakage detecting means may include suitable means such as an alarm light for indicating the presence of an oil leakage from the hydraulic circuit, or means for automatically stopping an operation of the press. However, suitable oil feeding means including an auxiliary oil reservoir and a pump may be provided to feeding the oil into the pressure regulating chamber of the pressure adjusting cylinder or the second pressure chambers of the cushioning cylinders, upon detection of the oil leakage, so that the piston of the pressure adjusting cylinder is brought to the predetermined initial position. According to this arrangement, the initial volume and pressure of the oil in the hydraulic circuit are first adjusted to the predetermined initial values prior to each pressing operation, and the oil pressure in the hydraulic circuit varies with a change in the oil volume according to the predetermined relationship. Accordingly, the actual blank-holding force can be controlled with high accuracy according to the predetermined optimum pattern, by changing the volume of the pressure regulating chamber of the pressure adjusting cylinder by the amount of change as calculated by the calculating means of the pressure adjusting means.

It is noted that the piston of the pressure adjusting cylinder is positioned for equilibrium between the thrust force based on the oil pressure in the pressure regulating chamber communicating with the second pressure chambers of the cushioning and the thrust force based on the oil pressure in the pilot chamber communicating with the pressure regulating device. Accordingly, the oil pressures in the pilot chamber and pressure regulating chamber of the pressure adjusting cylinder have a predetermined relationship determined by a ratio of the pressure-receiving areas of the piston which partially define those chamber. Therefore, the oil pressure sensor may be adapted to detect either the oil pressure in the pressure regulating chamber or the oil pressure in the pilot chamber.

The oil feeding means indicated above may be adapted to feed the oil into the hydraulic circuit until the piston of the pressure adjusting cylinder as detected by the piston position sensor coincides with the initial position. Alternatively, the oil feeding means may be arranged to obtain a distance between the actual and initial positions of the piston, calculate an optimum amount of oil flow into the hydraulic circuit, by multiplying the distance by the cross sectional area of the pressure regulating chamber, and feed the oil into the hydraulic circuit by the calculated optimum amount of oil flow, namely, until the actual amount of oil flow detected by a suitable oil flow meter coincides with the calculated optimum amount.

Where the piston drive means uses a linear drive means such as a linear motor for moving the piston of the pressure adjusting cylinder, the oil feeding means may be adapted to feed the oil in the hydraulic circuit after the piston is brought to the predetermined initial position, until the oil pressure in the second pressure chambers of the cushioning cylinders or in the pressure regulating chamber of the pressure adjusting cylinder coincides with the predetermined initial value.

In a fourth preferred form of this invention, the press further comprises elastic members disposed below the pressure member and in parallel to the cushioning cylinders. The elastic members are elastically contracted during a downward movement of the pressure ring and provide a resistance to the downward movement of the pressure member to enable the pressure member to be lowered in close contact with the blank, while the pressure member is kept parallel with the die.

In the above preferred form of the invention, the elastic members are provided to permit the pressure member to be lowered in contact with the blank and in parallel with the die, to assure good holding of the blank over the entire surface area of the pressure member, without any drawback due to inclination of the pressure member with respect to the die. Where the pressure chambers of the cushioning cylinders are filled with a liquid such as an oil, the liquid is fed into and from the pressure chambers. Consequently, in the case that the pressure chambers communicate with each other, the rates of flow of the liquid into the pressure chambers of the different cushioning cylinders may differ from each other, leading to a variation in the amounts of displacement of the piston of the cushioning cylinders, which results in inclination of the pressure member. The present arrangement eliminates this drawback. The biasing force provided by the elastic members is selected to be sufficient for supporting the pressure member even when the blank-holding force is not generated by the cushioning cylinders. The elastic members may be constituted by spring members such as compression coil springs, or gas cylinders charged with compressed gas.

BRIEF DESCRIPTION OF THE DRAWINGS

The above and optional objects, features, advantages and technical significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
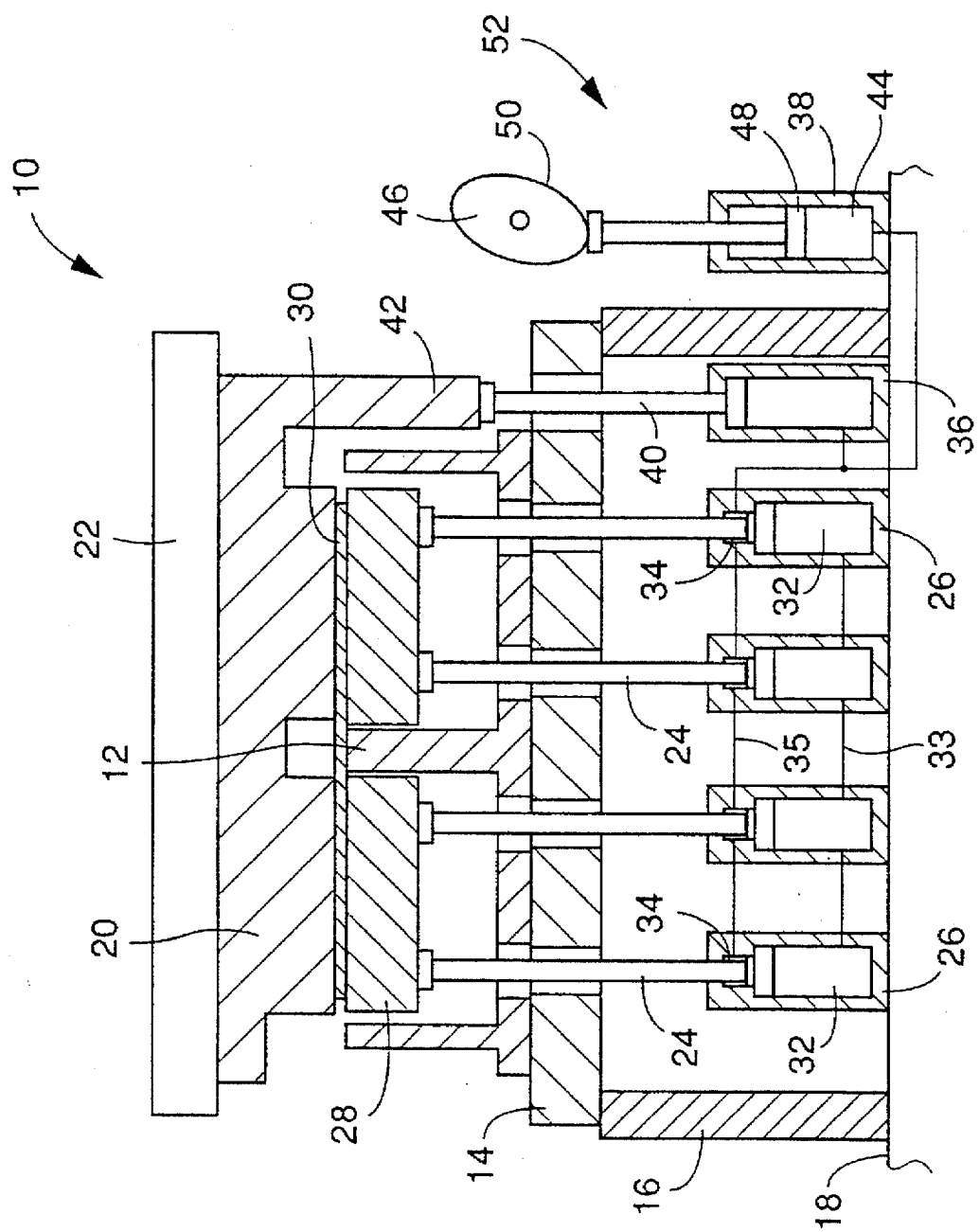
FIG. 1 is a schematic elevational view in cross section of a press constructed according to a first embodiment of this invention.

Referring first to FIG. 1, there is shown a press 10 where a bolster 14 on which a punch 12 is mounted is fixedly positioned on a base 18 via a press carrier 16, while a press slide 22 carrying a die 20 fixed thereto is reciprocated in the vertical direction by a drive device (not shown) which includes a crankshaft rotated by an electric motor, and links connected to the crankshaft. The punch 12 and the bolster 14 have a multiplicity of through-holes through which respective cushion pins 24 extends. These cushion pins 24 function as piston rods of cushioning cylinders in the form of hydro-pneumatic cylinders 26 disposed below the bolster 14. The hydro-pneumatic cylinders 26 are fixed to the base 18. The cushion pins 24 support at their upper ends a pressure member in the form of a pressure ring 28 disposed within the punch 28. The pressure ring 28 cooperates with the vertically reciprocable die 20 to hold a blank 30 therebetween when the die 20 is lowered with the press slide 22 and cooperates with the punch 12 to perform a drawing operation on the blank 30. The pressure ring 28 is shaped and positioned for contact with a radially outer portion of the blank 30.

A force to hold the blank 30, that is, a blank-holding force is generated by the hydro-pneumatic cylinders 26. With the blank 30 being gripped with this blank-holding force by and between the pressure ring 30 and the die 20, the blank 30 is drawn by the die 20 and punch 12 as the die 20 is lowered. The punch 12, die 20 and pressure ring 28 constitute a die set corresponding to the blank 30. The number and positions of the hydro-pneumatic cylinders 26 are determined as needed depending upon the specific configuration (size and shape) of the blank 30 or pressure ring 28. For instance, the hydro-pneumatic cylinders 26 are installed at selected positions in a matrix or lattice arrangement which covers the entire surface area of the radially outer portion of the blank 30 at which the blank is gripped. The through-holes formed through the bolster 14 and punch 12 are positioned for alignment with the respective hydro-pneumatic cylinders 26. Alternatively, the bolster 14 has a cutout covering the radially outer portion of the blank 30 indicated above.

Each hydro-pneumatic cylinder 26 is designed so that the piston is movable over a distance larger than the operating stroke of the pressure ring 28 during the pressing or drawing cycle. The cylinder 26 has a first pressure chamber 32 whose volume decreases with a downward movement of the corresponding cushion pin 24, and a second pressure a chamber 34 whose volume increases with the downward movement of the cushion pin 24. The first pressure chambers 32 of all the cylinders 26 communicate with each other through a communication 33, while the second pressure chambers 34 of the cylinders 26 communicate with each other through a communication line 35. The first pressure chambers 32 are filled with a gaseous fluid such as nitrogen gas, while the second pressure chambers 34 are filled with a fluid in the form of an oil. A force corresponding to a difference between the pressures in the first and second pressure chambers 32, 34 of each cylinder 26 is transferred to the pressure ring 28 through the corresponding cushion pin 24. Explained in detail, a force f which is generated by each hydro-pneumatic cylinder 26 and which acts on the cushion pin 24 is expressed by the following equation (1):

$$f = P_g \cdot S_g - P_o \cdot S_o \quad (1)$$

where,

Pg: gas pressure in the first pressure chamber 32,

Po: oil pressure in the second pressure chamber 34,

Sg: pressure-receiving area of the piston of the cylinder 26 which partially defines the first pressure chamber 32, So: pressure-receiving area of the piston of the cylinder 26 which partially defines the second pressure chamber 34

Initial values Pgo and Poo of the gas and oil pressures Pg, Po prior to a pressing cycle are determined and set so as to provide the desired blank-holding force, depending upon the pressure-receiving areas Sg and So of the cylinder 26. The blank-holding force which actually acts on the blank 30 through each cushion pin 24 is equal to the force f minus the weight of the cushion pin 24 and the fraction of the weight of the pressure ring 28 which the cushion pin 24 is assigned to bear.

Since the first pressure chambers 32 and the second pressure chambers 34 of all the cylinders 26 communicate with each other through the respective communication lines 33, 34, the first pressure chambers 32 of all the cylinders 26 have the same gas pressure Pg, and the second pressure chambers 34 of all the cylinders 26 have the same oil pressures Po, so that the forces f which act on all the cushion pins 24 are substantially the same, even if the cylinders 26 have different piston positions during the pressing cycle due to length variation of the cushion pins 24 and the other dimensional or other errors of the related components. Accordingly, the blank-holding force is evenly distributed over the entire area of the pressure ring 28 through the cushion pins 24, if the cylinders 26 are arranged uniformly with respect to the area of the pressure ring 28, for example, if the cylinders 26 are provided corresponding to respective evenly divided sections of the pressure ring 28.

To the second pressure chambers 34 of the hydro-pneumatic cylinders 26, there are connected a volume compensating cylinder 36 and a pressure adjusting cylinder 38. The transverse cross sectional area of the pressure chamber of the volume compensating cylinder 36, that is, the pressure-receiving area of the piston of the cylinder 36 is equal to a sum n·So of the pressure receiving areas So of the pistons of all the cylinders 26, where "n" represents the number of the cylinders 26. The piston of the volume compensating cylinder 36 is connected to a piston rod 40 which is abuttable at its upper end on an engaging portion 42 formed on the die 20 at the moment when the die 20 comes into abutting contact with the blank 30 placed on the pressure ring 28. In this arrangement, a working oil in the volume compensating cylinder 36 is fed into the second pressure chambers 34 of the cylinders 26 when the die 20 is lowered in a pressing cycle so as to lower the piston of the cylinder 36 and also the pistons of the cylinders 26. As a result, the oil pressure Po in the second pressure chambers 34 is maintained at a substantially constant level (if a flow resistance of the oil is ignored), even though the volume of the second pressure chamber 34 of each cylinder 26 increases with the downward movement of its piston. The engaging portion 42 formed on the die 20 may be replaced by an engaging portion which is provided on the press slide 22 such that the length of the engaging portion is adjustable depending upon the sizes of the die set (12, 20, 28) and blank 30, so that the engaging portion on the press slide 22 may abut on the upper end of the piston rod 40 of the volume compensating cylinder 36 when the die 20 abuts on the blank 30 on the pressure ring 28. The single volume compensating cylinder 36 may be replaced by two or more pressure holding cylinders whose pistons have a total pressure receiving area equal to n·So.

Figure 2:
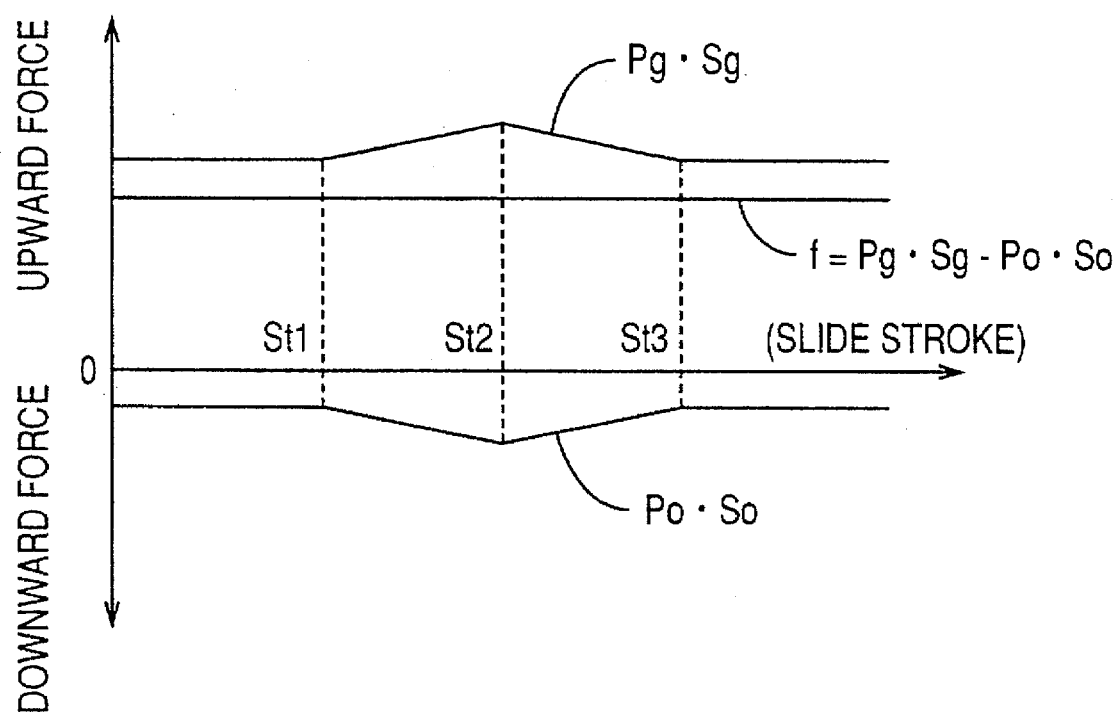
FIG. 2 is a graph indicating a force f generated by cushioning cylinders provided in the press of FIG. 1, which force f is controlled depending upon a hydraulic pressure Po.

The pressure adjusting cylinder 38 has a pressure regulating chamber 44 communicating with the second pressure chambers 34 of the hydro-pneumatic cylinders 26. The pressure regulating chamber 44 is partially defined by a piston 48 which is reciprocated in the vertical direction as a cam 46 is rotated. In other words, a rotary movement of the cam 46 causes the volume of the pressure regulating chamber 44 to increase and decrease, thereby changing the oil pressure Po in the second pressure chambers 34. For instance, the cam 46 is rotated in synchronously the rotation of the crankshaft of the drive device for reciprocating the press slide 22. The cam 46 has a cam surface (outer circumferential surface) 50 which is profiled to change the oil pressure Po according to a pattern corresponding to a predetermined pattern of change of the blank-holding force during the pressing cycle in which the pressure ring 28 is lowered. A upward force Pg·Sg generated based on the gas pressure Pg changes as indicated in the graph of FIG. 2 by way of example, with a change in the volume of the first pressure chamber 32 as the pressure ring 28 is reciprocated. However, the force f (=Pg·Sg) which acts on the cushion pin 24 can be held substantially constant by changing a downward force Po·So based on the oil pressure Po as also indicated in FIG. 2. When the upward force Pg·Sg increases with a decrease in the volume of the first pressure chamber 32 during a downward movement of the pressure ring 28, the piston 48 of the pressure adjusting cylinder 38 is lowered to decrease the volume of the pressure regulating chamber 44 so as to increase the oil pressure Po in the second pressure chamber 34. In FIG. 2, "St1" indicates the position of the press slide 22 at which the die 20 contacts the blank 30 during the downward movement of the slide 22, and "St2" indicates the lower stroke end of the press slide 22, while "St3" indicates the position of the slide 22 at which the die 20 is separated from the blank 30 during the upward movement of the slide 22.

In the present embodiment of the invention, the volume compensating cylinder 36, pressure adjusting cylinder 38, piston rod 40, engaging portion 42 and cam 46 cooperate to constitute pressure adjusting means indicated generally at 52 in FIG. 1, which is adapted to control the oil pressure Po in the second pressure chamber 34 of each hydro-pneumatic cylinder 26 to hold the force f at a substantially constant value throughout the pressing cycle on the blank 30. It is noted that the volume compensating cylinder 36 may be eliminated if the cam 46 is suitably shaped and the pressure-receiving area of the pressure adjusting cylinder 38 is suitably determined, so as to compensate for a change in the volume of the second pressure chamber 34 of the cylinders 26 during the pressing cycle.

Figure 3:
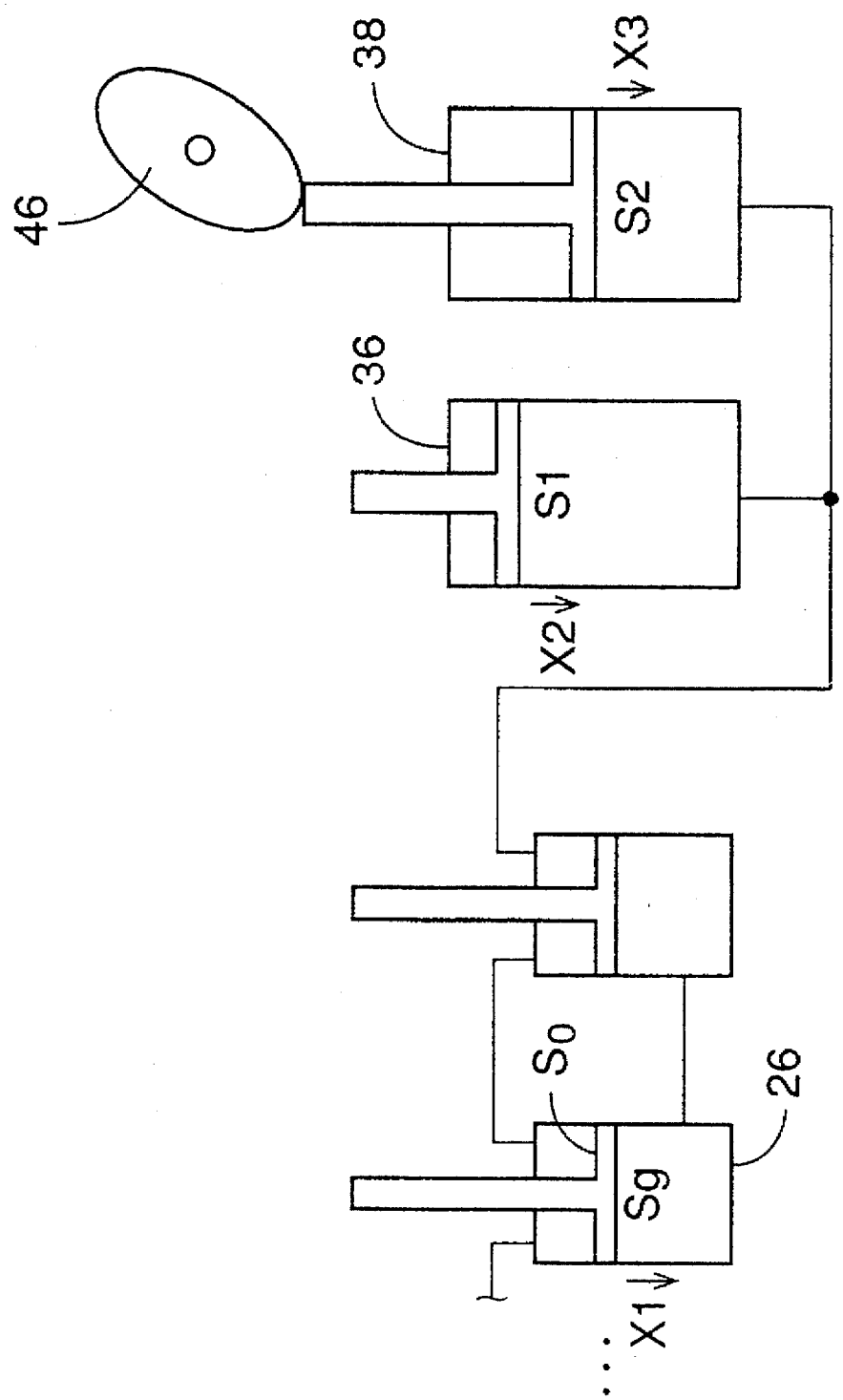
FIG. 3 is a view indicating amounts of piston displacement and pressure-receiving areas of various cylinders provided in the press of FIG. 1, for analyzing the force f of the cushioning cylinder.

Referring to FIG. 3, there will be described a relationship between the amount of displacement of the piston of the pressure adjusting cylinder 38 and the force f which acts on each cushion pin 24. That is, the gas pressure Pg after the piston of the hydro-pneumatic cylinder 26 is displaced is represented by the following equation (3) which is obtained by conversion from the following equation (2):

$$Pgo \cdot Vg = Pg \cdot (Vg - n \cdot X1 \cdot Sg) \tag{2}$$

$$Pg = Pgo \cdot Vg/(Vg - n \cdot X1 \cdot Sg) \tag{3}$$

where,

X1=X2

S1=n·So

X1: piston displacement of the cylinder 26 with a downward movement of the press slide 22, X2: piston displacement of the cylinder 36 with the downward movement of the press slide 22, X3: piston displacement of the cylinder 38 by the cam 46, S1: pressure-receiving area of the cylinder 36, S2: Pressure-receiving area of the cylinder 38, Pgo: initial gas pressure in the cylinder 26 before the piston displacement, Vg: initial total gas volume of the first pressure cheers 32 and line 33

Similarly, the oil pressure Po after the piston 48 of the pressure adjusting cylinder 38 is displaced is represented by the following equation (5) which is obtained by conversion from the following equation (4):

$$K = -\Delta P/(\Delta Vo/Vo) = -(Poo-Po)/(X3 \cdot S2/Vo) \quad (4)$$

$$Po = Poo + X3 \cdot S2 \cdot K/Vo) \quad (5)$$

where,

Poo: initial oil pressure in the cylinder 26 before before the piston displacement of the cylinder 38, Vo: initial total oil volume of hydraulic circuit communicating with pressure chambers 34, K: modulus of elasticity of volume of the oil The following equation (6) is obtained from the above equations (1), (3) and (5), by substituting the right members of the equations (3) and 5) for the values "Pg" and "Po" in the equation (1):

$$f = Sg \cdot Pgo \cdot Vg/(Vg - n \cdot X1 \cdot Sg) - So(Poo + X3 \cdot S2 \cdot K/Vo) \quad (6)$$

The equation (6) indicates that the force f changes with the variable parameters X1 and X3. The cam surface 50 of the cam 46 is shaped or profiled according to the equation (6), so that the force f generated by each hydro-pneumatic cylinder 26 changes according to a desired pattern. While the equation (6) does not include the flow resistance of the working oil as a parameter, the force f may be determined by taking into account the cross sectional area of the oil flow passage (e.g., line 35) and the pressing speed (reciprocating speed of the press slide 22).

In the press 10 constructed according to the first embodiment of the present invention as described above, the blank-holding force (determined by the force f generated by the cylinders 26) during the pressing cycle is automatically changed according to a desired pattern, and is distributed evenly over the entire area of the pressure ring 28, irrespective of the dimensional or other errors of the related components. Thus, the present press 10 assures improved quality of the product obtained by drawing the blank 30, and permits the use of a low-quality material as the blank 30, namely, a relatively inexpensive material which tends to easily undergo cracking and/or creasing if the blank-holding force is not distributed evenly at the local portions of the blank 30 through the pressure ring 28. Further, the cushioning device used in the present press 10 is capable of changing the blank-holding force by simply providing the hydro-pneumatic cylinders 26 corresponding to the cushion pins 24, and the pressure adjusting means 52 for adjusting the oil pressure Po in the cylinders 26. Accordingly, the present cushioning device is simpler in construction and is available at a lower cost than the prior art cushioning device which uses the cushioning air cylinder for generating the blank-holding force and the balancing hydraulic cylinders which are separate from the air cylinder.

In the present embodiment, the first pressure chambers 32 of all the cylinders 26 communicate with each other through the line 33 while the second pressure chambers 34 of these cylinders 26 communicate with each other through the line 35, so that the gas pressure values Pg and the oil pressure values Po of all the cylinders 26 are controlled to the same levels. This arrangement permits a higher degree of uniformity or evenness of distribution of the blank-holding force, than an arrangement in which the pressure values Po, Pg in the individual cylinders 26 are controlled independently of each other. Since the single or common pressure adjusting means 52 is used for all the hydro-pneumatic cylinders 26 as the cushioning cylinders, the cushioning device is further simplified, and the cost of manufacture is further reduced.

In principle, the blank-holding force is generated based on the pressure Pg of the gas filling the first pressure chambers 32 whose volume decreases as the cushion pins 24 are lowered, and the thus generated force is adjusted by changing the pressure Po of the oil in the second pressure chambers 34. Thus, the blank-holding force is not adjusted by changing the pressure Pg of the gas whose modulus of volume elasticity is considerably small. Therefore, the blank-holding force can be adjusted or changed with a higher response in the present arrangement than in an arrangement in which the gas pressure Pg is changed to adjust the blank-holding force. This means that the blank-holding force can be controlled with high accuracy according to the desired pattern of change even when the pressing speed is relatively high. Moreover, the oil pressure Po can be readily controlled without a risk of oil leakage, since the oil pressure Po in the second pressure chambers 34 to be controlled is generally low. Further, the provision of the volume compensating cylinder 36 also communicating with the second pressure chambers 34 of the hydro-pneumatic cylinders 26 permits the pressing cycle to be performed at a comparatively high speed. Described more particularly, a downward movement of the die 20 during the pressing cycle which causes a downward movement of the pistons of the cylinders 26 also causes a decrease in the volume of the pressure chamber in the volume compensating cylinder 36, thereby causing the oil to flow from the cylinder 36 into the second pressure chambers 34 as the volume of these chambers 34 increases due to the downward movement of the pistons of the cylinders 26. This oil flow into the second pressure chambers 34 facilitates the downward movement of the press slide 22. On the other hand, an upward movement of the die 20 permits the pistons of the cylinders 26 to move upward by the increased gas pressure Pg in the first pressure chambers 32, while at the same time permitting the piston of the cylinder 36 to move upward with the oil flow from the second pressure chambers 34 into the cylinder 36. In this respect, it is particularly noted that the piston rod 40 of the volume compensating cylinder 36 is positively lowered by the engaging portion 42 of the die 20 when the die 20 is lowered, so that the oil is forced out of the cylinder 36 into the second pressure chambers 34 of the cylinders 26.

It is also noted that the piston 48 of the pressure adjusting cylinder 48 is driven by the cam 46 so as to change the volume of the pressure regulating chamber 44 to thereby change the oil pressure Po in the second pressure chambers 34 of the hydro-pneumatic cylinders 26. This arrangement assures higher response of the oil pressure Po to the changing position of the press slide 22, than an arrangement in which the oil pressure Po is changed by a pump and shut-off valves. Namely, a relatively small distance of movement of the piston 48 may cause the oil pressure Po to change by a relatively large amount and at a relatively high rate. Thus, the blank-holding force can be controlled with high accuracy according to the desired pattern determined by the profile of the cam surface 50. In the present embodiment, the volume compensating cylinder 36 is provided in addition to the pressure adjusting cylinder 38, so that a change in the volume of the second pressure chamber 34 of each cylinder 26 during the downward movement of the cushion pin 24 is compensated for by the oil flow from the cylinder 36 into the second pressure chamber 34. This means that the pressure adjusting cylinder 38 can be used for the sole purpose of changing the oil pressure Pg, and the cam 46 need not be shaped so as to compensate the oil pressure Po for the volumetric change of the second pressure chamber 34. Accordingly, the cam 46 can be relatively easily designed, and the required operating stroke of the piston 48 can be made relatively small.

Figure 4:
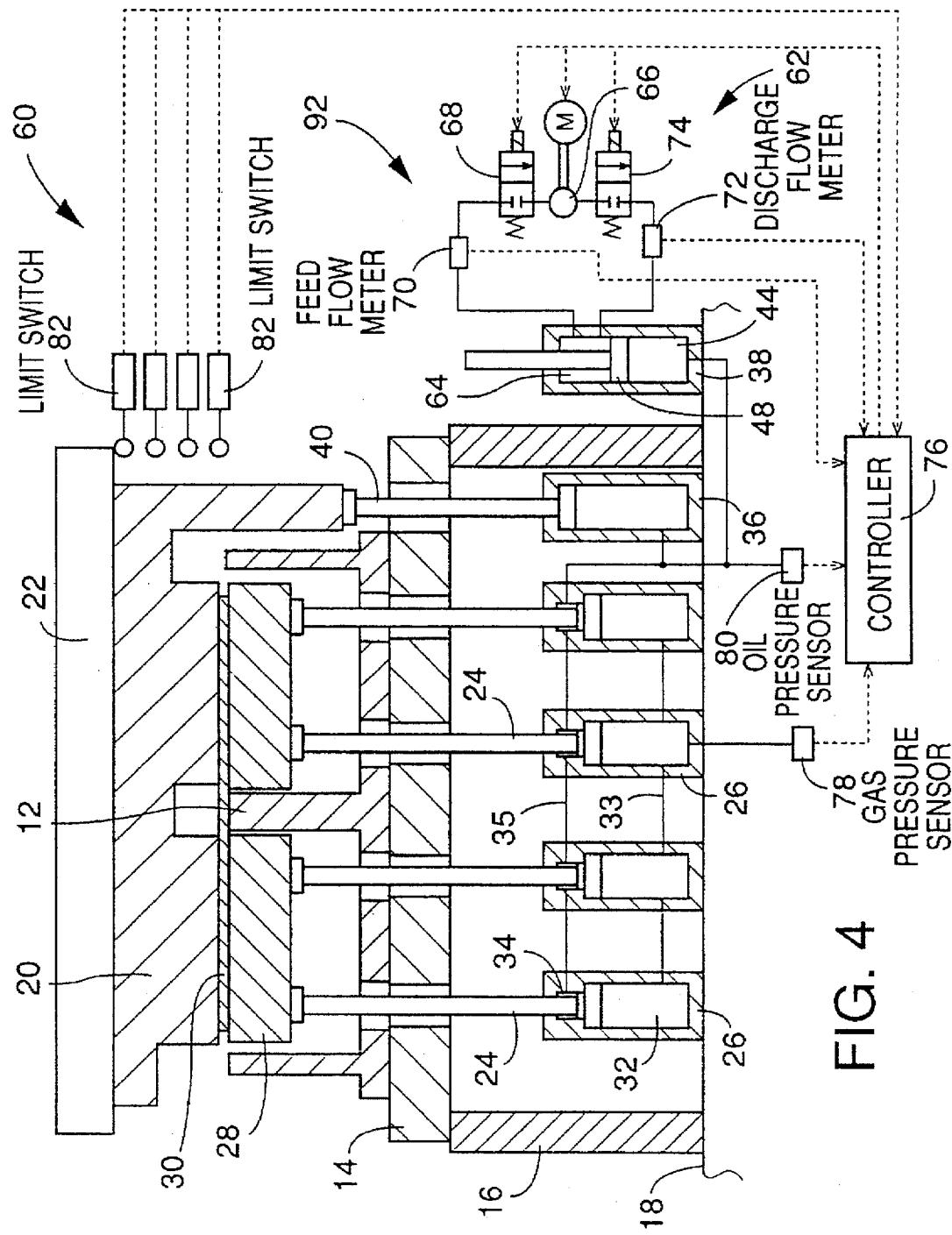
FIG. 4 is a schematic elevational view in cross section of a press according to a second embodiment of the invention.

Referring next to FIG. 4, there will be described a press 60 constructed according to a second embodiment of this invention. The same reference numerals as used in FIG. 1 will be used in FIG. 4 to identify the functionally corresponding components, which will not be described in the interest of brevity and simplification.

In the present press 60, a pressure regulating device 62 is used in place of the cam 46 used in the first embodiment. The pressure regulating device 62 is connected to a pilot chamber 64 of the pressure adjusting cylinder 38. The pilot chamber 64 is provided on the side of the piston 48 which is remote from the pressure regulating chamber 44. The piston 48 is moved by flows of the oil into and from the pilot chamber 64 by the pressure regulating device 62, to thereby adjust the pressure Po in the hydro-pneumatic cylinders 26. When the oil is fed from the device 62 into the pilot chamber 64 to move down the piston 48, the volume of the pressure regulating chamber 44 is reduced to increase the oil pressure Po. When the oil is discharged from the pilot chamber 64 by the device 62, the piston 48 is moved up by the oil pressure Po in the cheer 44, whereby the volume of the chamber 44 is increased and the oil pressure Po is lowered. The pressure regulating device 62 includes a pump 66, an oil feed shut-off valve 68, a feed flow meter 70, a discharge flow meter 70, and an oil discharge shut-off valve 74. The pump 66 and the shut-off valves 68, 74 are controlled by a controller 76, and output signals of the oil flow meters 70, 72 are fed to the controller 76.

The controller 76 includes a microcomputer incorporating a central processing unit, a random-access memory and a read-only memory. The central processing unit operates to control the press 60 and the pressure regulating device 62 according to control programs stored in the read-only memory, while utilizing a temporary data storage function of the random-access memory. The controller 76 receives output signals of a gas pressure sensor 78 for detecting the gas pressure Pg, an oil pressure sensor 80 for detecting the oil pressure Po, and a plurality of limit switches 82 for detecting the predetermined positions of the press slide 78 during the pressing cycle.

There will be described a routine executed by the controller 76 to control the pressure regulating device 62, by reference to the flow chart of FIG. 5.

The routine is started with step S1 to determine and set an optimum pattern of change Fr of the press load during each pressing cycle, which varies with the specific die set (12, 20, 28). The optimum load change pattern Fr may stored in a suitable memory medium attached to the die set (e.g., attached to the punch 12), and transmitted to the controller 76 through a suitable transmitter/receiver. Alternatively, the optimum load change pattern Fr may be entered by the user of the press 60 through suitable data input means such as a keyboard. The optimum load change pattern Fr consists of optimum load values Fri (optimum pressing force values) of the press 60 when the press slide 22 is located at the respective positions detected by the limit switches 82. In the present embodiment, the optimum load values Fri are expressed as the optimum force value f generated by each hydro-pneumatic cylinder 26. However, the optimum load change pattern Fr may be expressed as the total force $\Sigma f = f \cdot n$ which is the sum of the force values f generated by all the cylinders 26. Further, the optimum load change pattern Fr may be expressed as the pure blank-holding force which acts on the blank 30. This pure blank-holding force is equal to the total force $f \cdot n$ minus the weights of the cushion pins 24 and pressure ring 28.

Step S1 is followed by step S2 to determine whether a SLIDE POSITION signal has been generated from any one of the limit switches 82. This signal is generated when any one of the predetermined positions of the press slide 22 is detected by the corresponding limit switch 82. If an affirmative decision (YES) is obtained in step S2, the control flow goes to step S3 to read the oil pressure Po as represented by the output signal of the oil pressure sensor 80, and the gas pressure Pg as represented by the output signal of the gas pressure sensor 78. Then, the control flow goes to step S4 to calculate the force f on the basis of the pressures Po, Pg, and according to the above equation (1). The oil pressure sensor 80, gas pressure sensor 78, and a portion of the controller 76 assigned to implement steps S3 and S4 constitute load detecting means for detecting the pressing load in the form of the force f.

Figure 6:
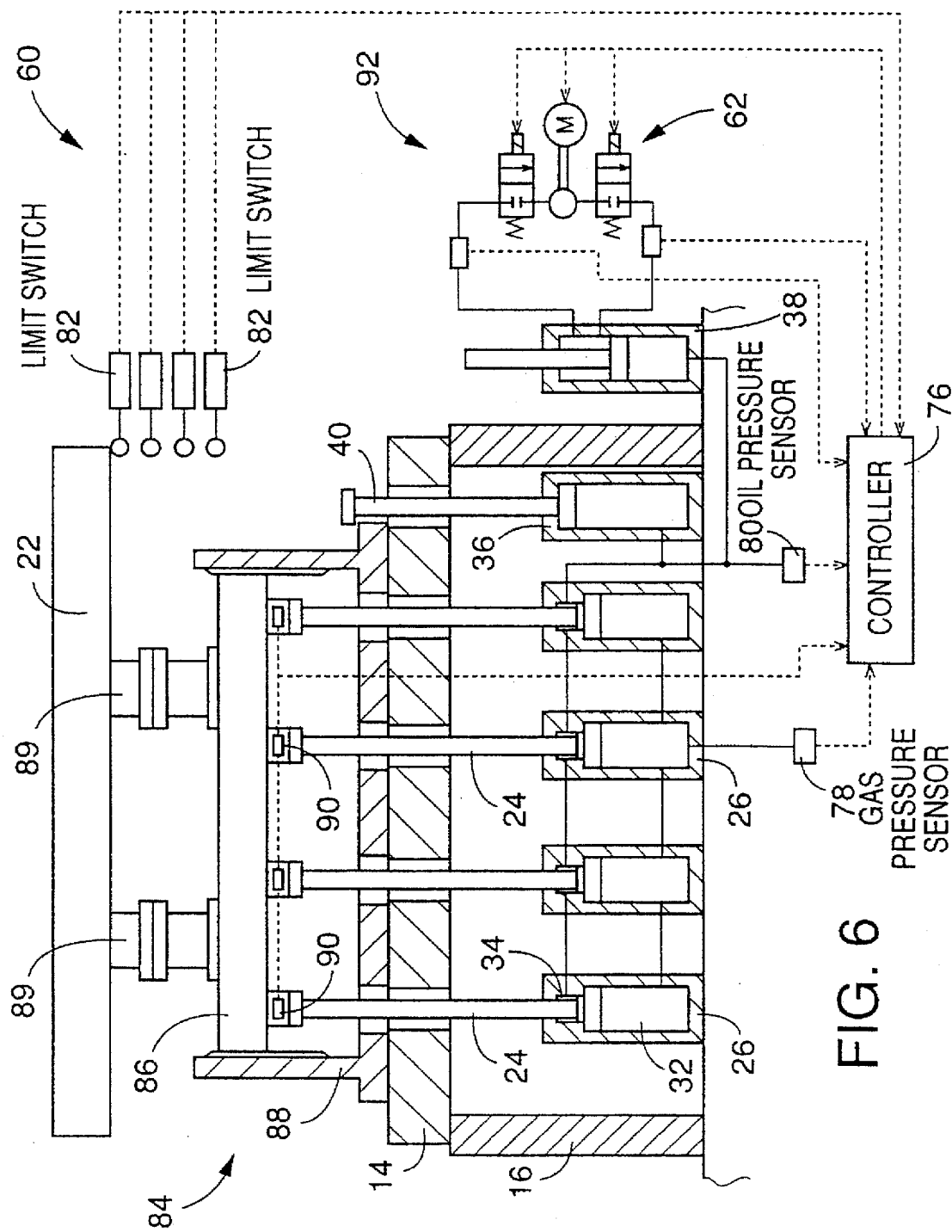
FIG. 6 is an elevational view showing a load measuring device installed on the press of FIG. 4, in place of a die set.

The pressure-receiving areas So and Sg which are used in the equation (1) to calculate the force f are stored in the random-access memory of the controller 76. These areas So, Sg are determined or detected by performing a trial pressing cycle or test pressing operation using a load measuring device 84 as shown in FIG. 6, before a production run of the press 60. This load measuring device 84 is installed on the press 60, in place of the die set (12, 20, 28). The device 84 includes a positioning member 88 positioned on the bolster 14, and a measuring block 86 which is positioned within the positioning member 88 and supported by the cushion pins 24 such that the block 86 is vertically movable. The measuring block 86 has a plurality of downwardly extending bosses held in contact with the upper ends of the respective cushion pins 24. Each of these bosses has a strain gage 90 for measuring a load F acting thereof. The controller 76 receives the output signals of the strain gages 90 indicative of the load values F, during a trial pressing cycle conducted on the press 60, to calculate the pressure-receiving areas So and Sg of the hydro-pneumatic cylinders 26, according to a routine illustrated in the flow chart of FIG. 7. The measuring block 86 further has a plurality of upwardly extending abutting bosses 89, so that the press slide 22 abuts on the bosses 89 during the trial pressing cycle.

Figure 7:
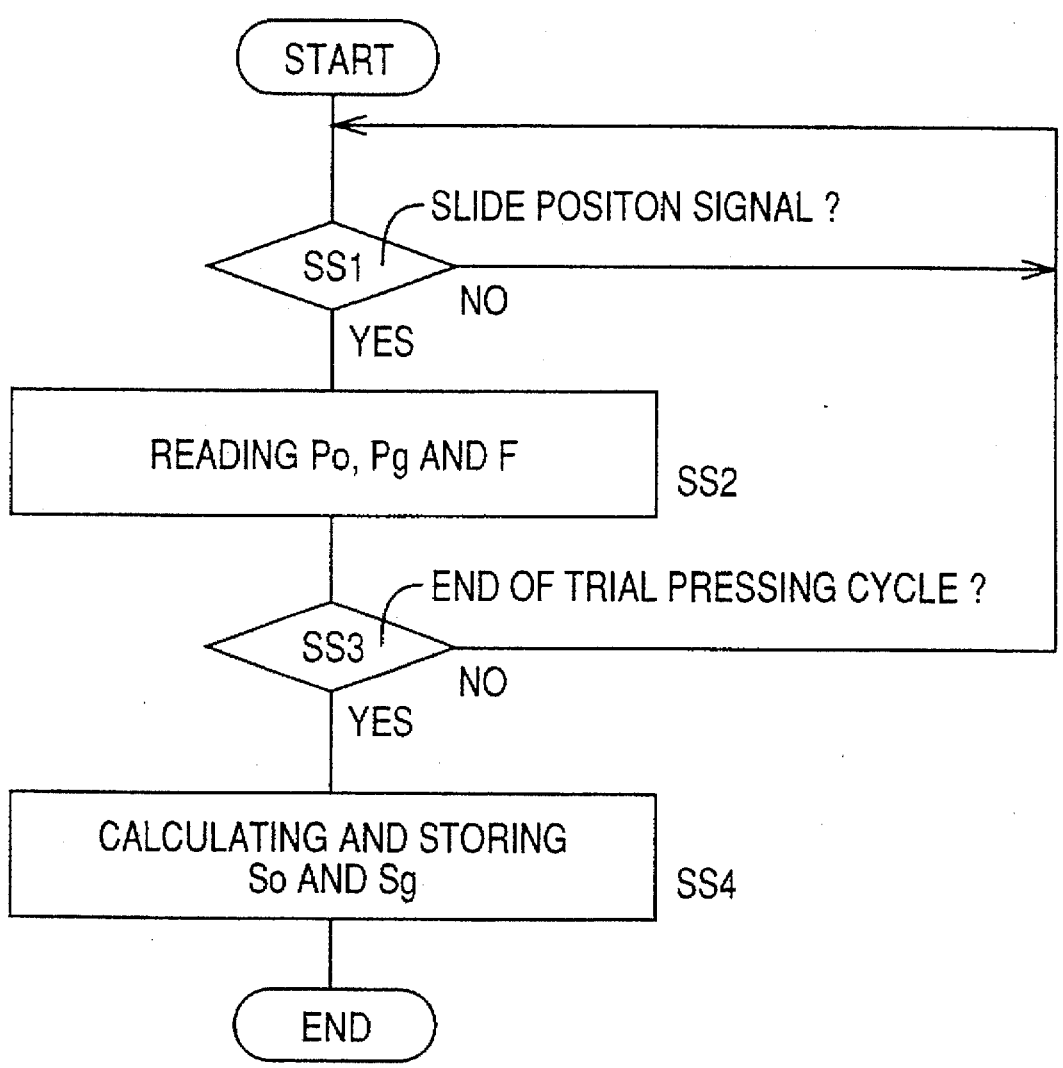
FIG. 7 is a flow chart illustrating an operation to obtain pressure-receiving areas So and Sg of the cushioning cylinder, by using the load measuring device of FIG. 6.

The routine of FIG. 7 is initiated with step SS1 to determine whether the SLIDE POSITION signal has been generated from any one of the limit switches 82. If an affirmative decision (YES) is obtained in step SS1, the control flow goes to step SS2 to read the oil and gas pressures Po, Pg as represented by the output signals of the sensors 80, 78, and the load values F as represented by the output signals of the strain gages 90. Step SS2 is followed by step SS3 to determine whether the trial pressing cycle has been completed with one reciprocation of the press slide 22. This determination can be made depending upon whether the SLIDE POSITION signal has been generated from the uppermost limit switch 82 during the upward movement of the press slide 22 from its lower stroke end. Alternatively, the determination may be made based on the detected angle of rotation of the crankshaft of the drive device for reciprocating the press slide 22. Steps SS1, SS2 and SS3 are repeatedly implemented until the affirmative decision (YES) is obtained in step SS3. Thus, the oil and gas pressures Po, Pg and the load values F are read each time the SLIDE POSITION signal is received. When the affirmative decision (YES) is obtained in step SS3, the control flow goes to step SS4 to calculate the pressure-receiving areas So, Sg according to the following equation (7) and store the calculated values So, Sg in the random-access memory of the controller 76.

$$\Sigma F = n(f - Wp) \qquad (7)$$
$$= n(Sg \cdot Pg - So \cdot Po - Wp)$$

where, $\Sigma F$: sum of the load values F, n: number of the hydro-pneumatic cylinders 26, Wp: total weight of the cushion pins 24

Since the values n and Wp are known, the values Sg and So can be calculated according to the above equation (7) if two or more values have been obtained for each of the parameters $\Sigma F$, Pg and Po. The weight Wp can also be calculated if three or more values have been obtained for each of the parameters $\Sigma F$, Pg and Po.

It will be understood that a portion of the controller 76 assigned to implement steps SS1-SS4 cooperates with the load measuring device 84 including the strain gages 90, to constitute means for determining the pressure receiving areas Sg and So of the hydro-pneumatic cylinders 26. The areas Sg and So may be obtained based on the load values F as represented by the single strain gage 90 provided on the measuring block 86 in contact with a selected one of the cushion pins 24.

Figure 5:
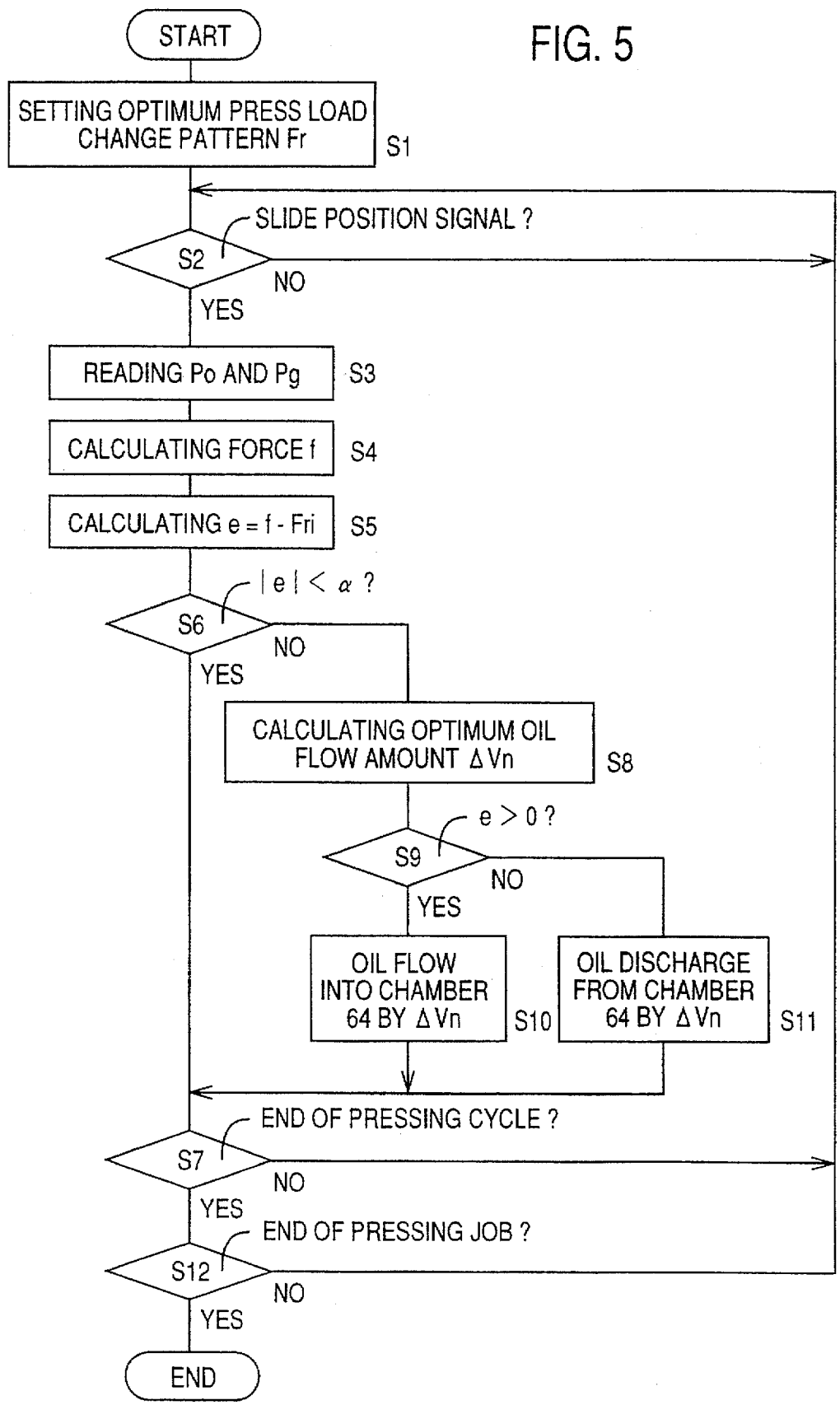
FIG. 5 is a flow chart illustrating an operation of the press of FIG. 4.

Referring back to the flow chart of FIG. 5, step S4 is followed by step S5 to calculate an error or difference e=f−Fri, by comparing the force f calculated in step S4 with the optimum force value Fri which corresponds to the position of the press slide 22 as detected by the currently received SLIDE position signal. Step S5 is followed by step S6 to determine whether the absolute value of the error e is smaller than a predetermined tolerance value α. If an affirmative decision (YES) is obtained in step S6, the control flow goes to step S7. If a negative decision (NO) is obtained in step S6, the control flow goes to step S8 to calculate an optimum oil flow amount $\Delta Vn$ on the basis of the error e. The optimum oil flow amount $\Delta Vn$ is an amount of flow of the oil into or from the pilot chamber 64 of the pressure adjusting cylinder 38, which amount is necessary for the actually detected force f to coincide with the optimum load value Fri. Namely, the amount of change of the volume of the pilot chamber 64 is calculated based on the error e.

An amount of change $\Delta f$ of the force f which occurs by an amount of change $\Delta Vm$ of the volume of the pressure regulating chamber 44 is an amount of change of the force f obtained by substituting (S2·X3+$\Delta Vm$) for S2·X3 in the above equation (6). Therefore, the amount of change $\Delta f$ is expressed by the following equation (8):

$$\Delta f = So \cdot \Delta Vm \cdot K/Vo \qquad (8)$$

The above equation (8) can be converted into the following equation (9):

$$\Delta Vm = Vo \cdot \Delta f / So \cdot K \qquad (9)$$

Since the displacement amount of the piston 48 of the pressure adjusting cylinder 38 is the same with respect to the pilot and pressure regulating chambers 64, 44, the amount of change $\Delta Vm$ of the volume of the pressure regulating chamber 44 and the corresponding optimum oil flow amount $\Delta Vn$ (amount of change of the volume of the pilot chamber 64) have a relationship, $\Delta Vm/S2 = \Delta Vn/S3$, where S3 represents the pressure-receiving area of the cylinder 38 on the side of the pilot chamber 64. Hence, the above equation (9) may be converted into the following equation (10):

$$\Delta Vn = Vo \cdot \Delta f \cdot S3 / So \cdot K \cdot S2 \qquad (10)$$

Accordingly, the optimum oil flow amount $\Delta Vn$ necessary to change the actual force f to the optimum load value Fri can be calculated by substituting the error e for the amount of change $\Delta f$ in the above equation (10). While step S8 is adapted to calculate the optimum oil flow amount $\Delta Vn$ on the basis of the error e, this step S8 may be considered as a step of calculating the optimum amount of change $\Delta Vm$ of the volume of the pressure regulating chamber 44. It will be understood that a portion of the controller 76 assigned to implement step S5 for calculating the error e and step S8 for calculating the optimum oil flow amount $\Delta Vn$ constitutes means for calculating the optimum amount of change $\Delta Vm$ of the volume of the pressure regulating chamber 44 of the pressure adjusting valve 38. It is noted that the values $\Delta f$, $\Delta Vm$ and $\Delta Vn$ in the above equations (8), (9) and (10) are absolute values, and do not indicate the direction of change (decrease or increase) of the values.

The next step S9 is provided to determine whether the error e is a positive value. If the error than zero, than zero, that is, if the actually detected force f (calculated in step S5) is larger than the optimum load value Fri, step S10 is implemented to open the oil feed shut-off valve 68 and hold it open until the oil is fed into the pilot chamber 64 by the optimum oil flow amount $\Delta Vn$ calculated in step S8. This amount $\Delta Vn$ is measured or detected by the feed flow meter 70. Consequently, the volume of the pressure regulating chamber 44 is reduced by the amount $\Delta Vm$, and the oil pressure Po is accordingly increased, whereby the force f generated by each cylinder 26 is lowered by $\Delta f$ or by the error amount e, so that the force f is made equal to the optimum value Fri. If the error e is equal to or smaller than zero, that is, if the actually detected force f is smaller than the optimum load value Fri, the control flow goes to step S11 to open the oil discharge shut-off valve 74 and hold it open until the oil is discharged from the pilot chamber 64 by the calculated optimum oil flow amount $\Delta Vn$, namely, until the discharge flow meter 70 has measured the discharge flow amount $\Delta Vn$. As a result, the volume of the chamber 44 is increased by the amount $\Delta Vm$, and the oil pressure Po is accordingly lowered, whereby the force f is increased by $\Delta f$ or by the error amount e, so that the force f is made equal to the optimum value Fri.

It will be understood that a portion of the controller 76 assigned to implement steps S10 and S11 cooperates with the pressure regulating device 62 to constitute piston drive means for moving the piston 48 of the pressure adjusting cylinder 38 to adjust or change the oil pressure Po for changing the force f according to the desired pattern.

While the above embodiment is adapted such that the shut-off valves 68, 74 are held open until the calculated optimum amount $\Delta Vn$ of the oil flow into or from the pilot chamber 64 has been detected by the appropriate oil flow meter 70, suitable time measuring means such as a timer may be used to measure a valve opening time during which the shut-off valves 68, 74 are held open. The valve opening time can be obtained by dividing the nominal delivery rate of the pump 66 by the optimum oil flow amount $\Delta Vn$.

Although the above equations (8) through (10) do not include a parameter indicative of a change of the gas pressure Pg with the downward movement of the press slide 22 during a period of the oil flow into or from the pilot chamber 64, the amount of change of the gas pressure Pg may be taken into account in determining the valve opening time or optimum oil flow amount ΔVn necessary to change the force f by Δf=e. In this case, the amount of change Δf of the force f when the oil is fed into or discharged from the pilot chamber 64 at a predetermined rate is expressed by a time or amount of the oil flow (amount of volume change ΔVm of the chamber 44, on the basis of the amount of change of the oil pressure Po as a result of the volume change of the chamber 44, and on the basis of the amount of change of the gas pressure Pg as a result of the volume change of the first pressure chamber 32, when each of the predetermined positions of the press slide 22 is detected by the limit switches 82. The above-indicated time or amount of the oil flow can be used as a parameter indicative of the amount of change of the gas pressure Pg. Where the time t is used as the parameter, the optimum oil flow amount ΔVn is expressed as a function g(t) while an amount of change of the displacement X1 from the nominal value is expressed as a function h(t), and the values X1 and S2·X3 in the above equation (6) are replaced by {X1+h(t)} and {S2·X3+g(t)}. Consequently, the amount of change ΔF of the force f can be expressed by the following equation (11) which includes the time t as the parameter:

$$\Delta f = \frac{n \cdot Vg \cdot Pgo \cdot Sg^2 \cdot h(t)}{(Vg - n \cdot X1 \cdot Sg)[Vg - n\{X1 + h(t)\} \cdot Sg]} - \frac{So \cdot K \cdot g(t)}{Vo} \quad (11)$$

Referring back to the routine of FIG. 5, step S7 which is implemented if the affirmative decision (YES) is obtained in step S6 is provided to determine whether the present pressing cycle has been completed with one reciprocation of the press slide 22. This step S7 is identical with step SS3 in the routine of FIG. 7. If a negative decision (NO) is obtained in step S7, the control flow goes back to step S2. Thus, steps S2–S11 are repeatedly implemented until the present pressing cycle has been completed. As a result, the force f generated by each hydro-pneumatic cylinder 26 is adjusted or changed according to the predetermined optimum load change pattern Fr. If an affirmative decision (YES) is obtained in step S7, the control flow goes to step S12 to determine whether the intended pressing job has been completed, for example, whether a predetermined number of pressing cycles have been completed. Thus, the pressing cycles are performed while the force f is controlled in each cycle according to the optimum load change pattern Fr with steps S2–S11 repeatedly implemented. When the press slide 22 is returned to the upper stroke end at the end of each pressing cycle, the pressure regulating device 62 is activated to move the piston 48 of the pressure adjusting cylinder 38 until a predetermined initial position of the piston 48 is detected by suitable position detecting means, or until the force f calculated on the basis of the gas and oil pressures Pg, Po is made equal to a predetermined initial value.

As described above, the press 60 according to the present second embodiment of the invention is constructed to obtain the difference or error e between the force f indicative of the actual blank-holding force at each of the predetermined positions of the press slide 22 and the corresponding value Fri of the predetermined optimum load change pattern Fr, and calculate the oil flow amount ΔVn necessary to change the force f by the obtained error e, so that the oil is fed into or discharged from the pilot chamber 64 of the pressure adjusting cylinder 38 by the calculated oil flow amount ΔVn, whereby the force f is made equal to the optimum value Fri of the predetermined load change pattern Fr. This arrangement assures a higher degree of operating response and a higher level accuracy of control of the force f according to the optimum load change pattern Fr, than an arrangement in which the oil flows into and from the pilot chamber 64 are controlled in a feed-back manner so as to zero the error e. In particular, since the oil pressure Po is adjusted to control the force f, even a small distance of movement of the piston 48 permits a relatively large amount of change of the oil pressure Po at a relatively high rate, therefore assuring a further improvement in the control response of the force f to a change in the position of the piston 48.

It will be understood that the volume compensating cylinder 36, pressure adjusting cylinder 38, pressure regulating device 62, controller 76, gas pressure sensor 78, oil pressure sensor 80, limit switches 82 and load measuring device 84 constitute pressure adjusting means, which is indicated generally at 92 in FIG. 4.

It is also noted that the force f is calculated on the basis of the gas pressure Pg and oil pressure Po detected by the respective gas and oil pressure sensors 78, 80, and on the basis of the predetermined pressure-receiving areas Sg and So. Since the pressure-receiving areas Sg and So are calculated according to a predetermined relationship as defined by the above equation (7) on the basis of the load values F actually detected by the strain gages 90 and the pressures Pg, Po, the predetermined or calculated pressure-receiving areas Sg, So reflect the actual condition of the press 60 such as gas leakage, oil leakage, and measuring errors of the gas and oil pressure sensors 78,80. This arrangement assures high accuracy of control of the blank-holding force as represented by the force f, than an arrangement which uses the nominal design values or actually measured values of the pressure-receiving areas Sg, So.

Figure 8:
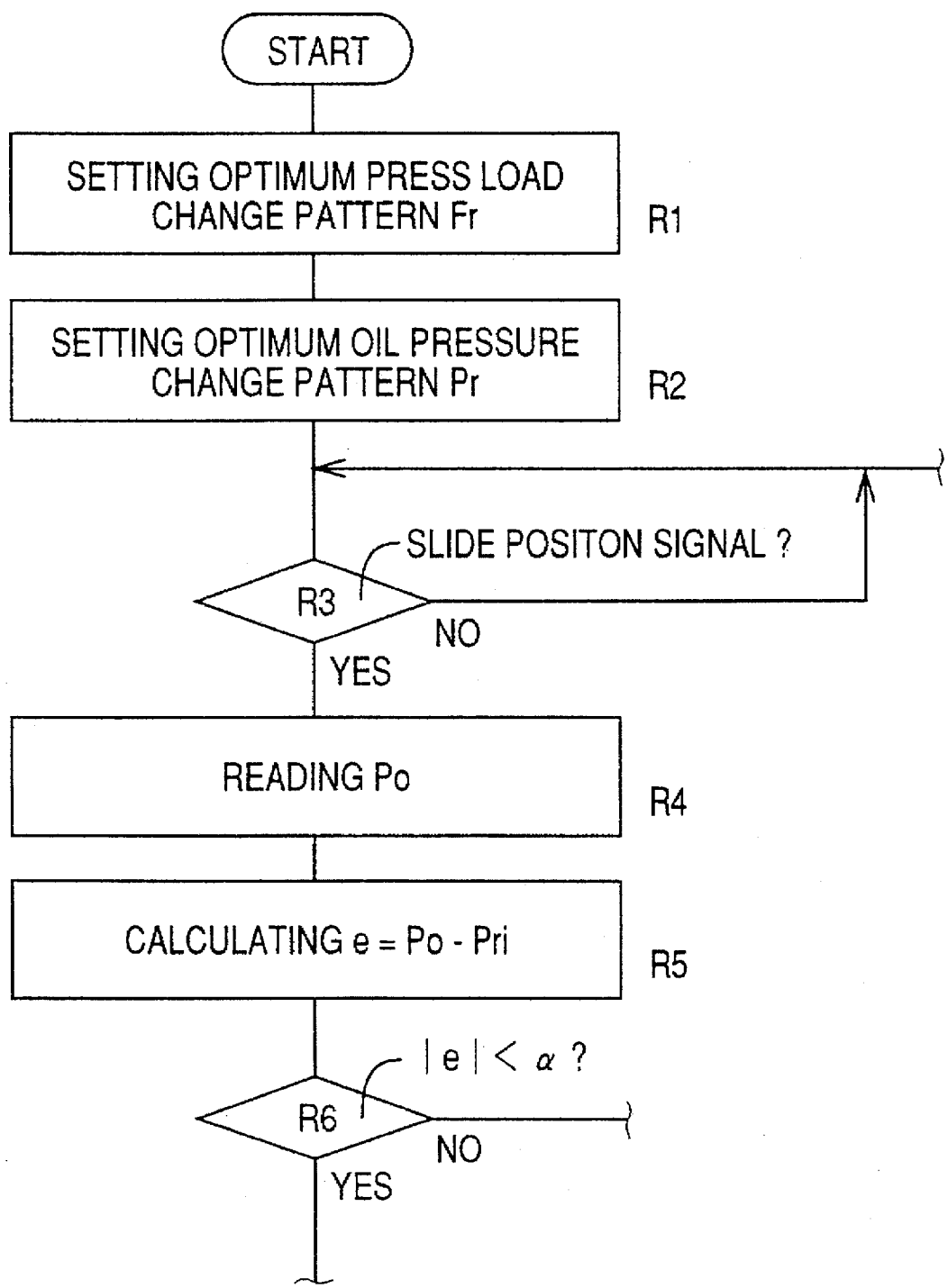
FIG. 8 is a flow chart corresponding to that of FIG. 5, illustrating an operation of the press according to a third embodiment of the invention.

In a third embodiment of the invention, the routine illustrated in the flow chart of FIG. 8 is used in place of the routine of FIG. 5, for controlling the pressure regulating device 62 of the press 60 of FIG. 4. However, the gas pressure sensor 78 may be eliminated in the present embodiment.

The routine of FIG. 8 is started with step R1 to set the optimum press load change pattern Fr as in the step S1 of FIG. 5. Step R1 is followed by step R2 to set an optimum oil pressure change pattern Pr on the basis of the optimum press load change pattern Fr. Described in detail, the force f is calculated according to the following equation (12), which is obtained from the above equations (1) and (3):

$$f = Sg \cdot Pgo \cdot Vg/(Vg - n \cdot X1 \cdot Sg) - So \cdot Po \quad (12)$$

Described in detail, the optimum press load change pattern Fr consists of optimum load values Fri corresponding to the predetermined positions of the press slide 22, which in turn corresponds to different amounts of the displacement X1 of the piston of each hydro-pneumatic cylinder 26. The oil pressure values Po corresponding to the predetermined positions of the press slide 22 are obtained by substituting the optimum load values Fri for the force f in the equation (12), and using, as the value X1 in the equation (12), the displacement values which correspond to the predetermined positions of the press slide 22. Then, optimum values Pri of the optimum oil pressure pattern Pr are obtained on the basis of the oil pressure values Po corresponding to the different positions of the press slide 22. The optimum oil pressure pattern Pr may be obtained directly from the above equation (12), without using the optimum press load change pattern Fr. Namely, step R1 may be eliminated. In this case, the optimum oil pressure pattern Pr is substantially the same as the optimum press load change pattern.

Then, the control flow goes to step R3 identical with the step S2 of FIG. 5, to determine whether the SLIDE POSITION signal has been generated by any one of the limit switches 82. If the affirmative decision (YES) is obtained in step R3, step R4 is implemented to read the oil pressure Po as represented by the output signal of the oil pressure sensor 80. Step R4 is followed by step R5 to calculate a difference or error e=Po−Pri, by comparing the detected oil pressure Po with the optimum oil pressure value Pri which corresponds to the position of the press slide 22 as represented by the SLIDE POSITION signal. Then, the control flow goes to step R6 to determine whether the absolute value of the error e is smaller than the predetermined tolerance value α, as in the step S6 of FIG. 5. Step R6 is followed by steps similar to steps S8–S12 of FIG. 5 of the second embodiment, for controlling the oil flows into and from the pilot chamber 64 of the pressure adjusting cylinder 38, so that the oil pressure Po changes in the optimum oil pressure change pattern Pr. In this case, the amount of change Δf of the force f with the movement of the piston 48 of the cylinder 38 primarily depends on the amount of change ΔPo of the oil pressure Po, namely, Wf=ΔPo·So. Consequently, the above equations (8) and (10) may be converted into the following equations (13) and (14), respectively:

$$\Delta Po = \Delta Vm \cdot K/Vo \quad (13)$$

$$\Delta Vn = Vo \cdot \Delta Po \cdot S3/K \cdot S2 \quad (14)$$

Thus, the optimum oil flow amount ΔVn can be obtained by substituting the error e for the amount of change ΔPo in the above equation (14). The optimum oil flow amount ΔVn may be determined by taking into account a suitable parameter indicative of the amount of change of the gas pressure Pg which occurs during a downward movement of the press slide 22 during a period of the oil flow into the pilot chamber 64.

The present third embodiment is substantially the same as the second embodiment, in that the volume of the pressure regulating chamber 44 is changed depending upon the error of the blank-holding force from the optimum value. In the present embodiment, a portion of the controller 76 assigned to implement step R4 cooperates with the oil pressure sensor 80 to constitute the load detecting means, while a portion of the controller 76 assigned to implement step R5 and the step (not shown) to calculate the optimum oil flow amount ΔVn on the basis of the error e constitutes the means for calculating the optimum oil flow amount ΔVn. As is apparent from the above equation (5), the oil pressure Po varies with the displacement X3 of the piston 48 of the pressure adjusting cylinder 38. Therefore, the optimum oil pressure change pattern Pr may be replaced by an optimum change pattern of the displacement X3, for controlling the blank-holding force.

Figure 9:
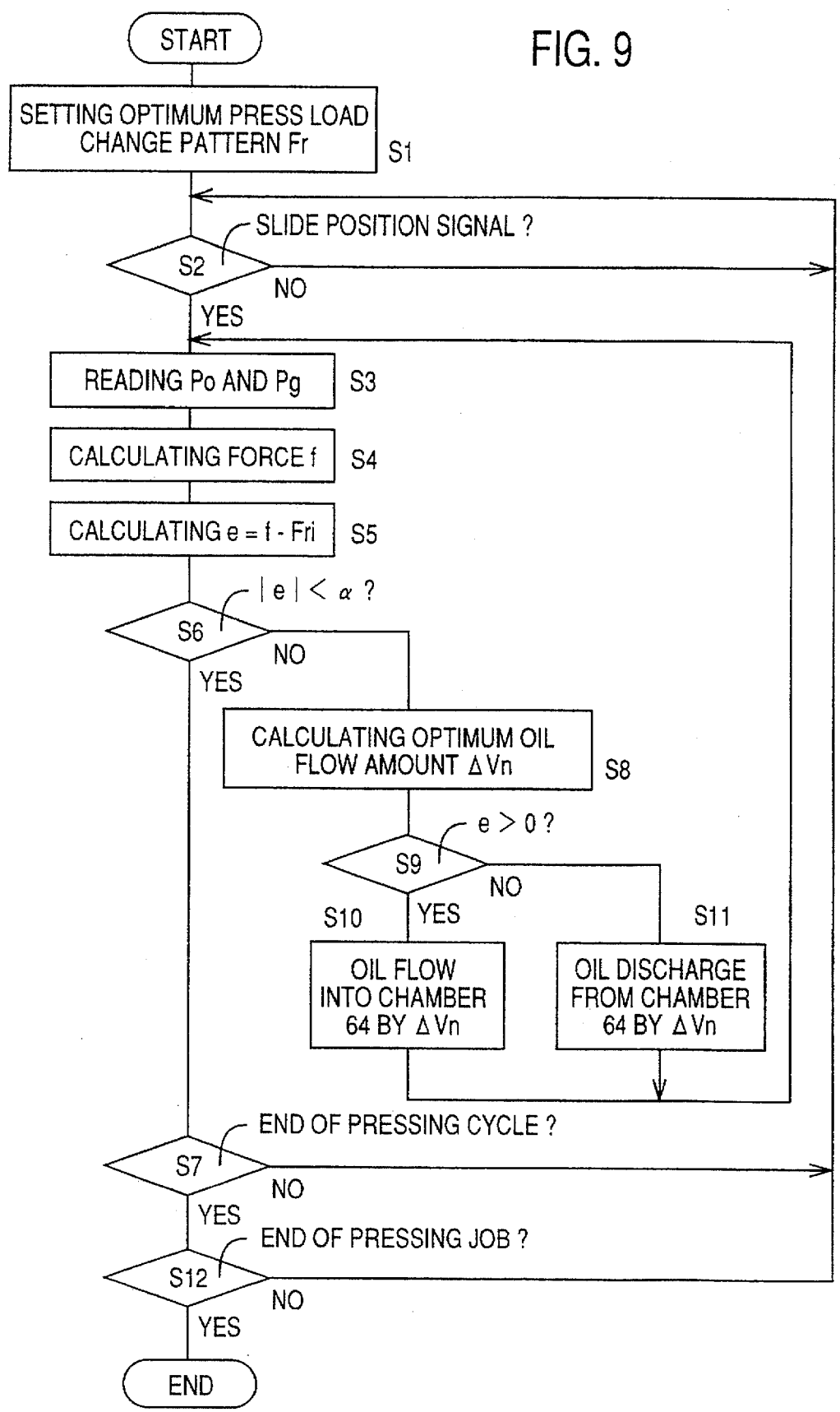
FIG. 9 is a flow chart corresponding to that of FIG. 5, illustrating an operation of the press according to a fourth further embodiment of the invention.

Referring to the flow chart of FIG. 9, there is illustrated a routine which is used in place of the routine of FIG. 5, according to a fourth embodiment of this invention. The routine of FIG. 9 is different from that of FIG. 5 in that steps S10 and S11 are followed by step S3, rather than followed by step S7. This arrangement permits feedback control of the force f for accurate coincidence with the optimum load values Fri of the optimum press load change pattern Fr. This feedback control is applicable to the third embodiment of FIG. 8. The optimum load values Fri and the optimum oil pressure values Pri used in the embodiments of FIGS. 5, 8 and 9 may be compensated depending upon the amount of change of the gas pressure Pg as a function of time.

There will next be described a press 100 constructed according to a fifth embodiment of the present invention, which is different from the press 60 of FIG. 4, in that the press 100 is equipped with: a piston position sensor 102 for detecting a position Xp of the piston 48 of the pressure adjusting cylinder 38; a oil pressure sensor 104 as a second oil pressure sensor for detecting an oil pressure Pn in the pilot chamber 64; an oil reservoir 106 for storing the oil; and a pump 108 for feeding the oil from the reservoir 106 into the volume compensating cylinder 36. In the present fifth embodiment, the pressure regulating device 62 and the pump 108 are controlled to initialize the oil pressure Pn and the piston position Xp according to a routine illustrated in the flow chart of FIG. 11, when the press 100 is placed in its initial position in which the die 20 is upwardly spaced apart from the blank 30 while the pistons of the cylinders 26 and 36 are located in their upper stroke ends.

Figure 11:
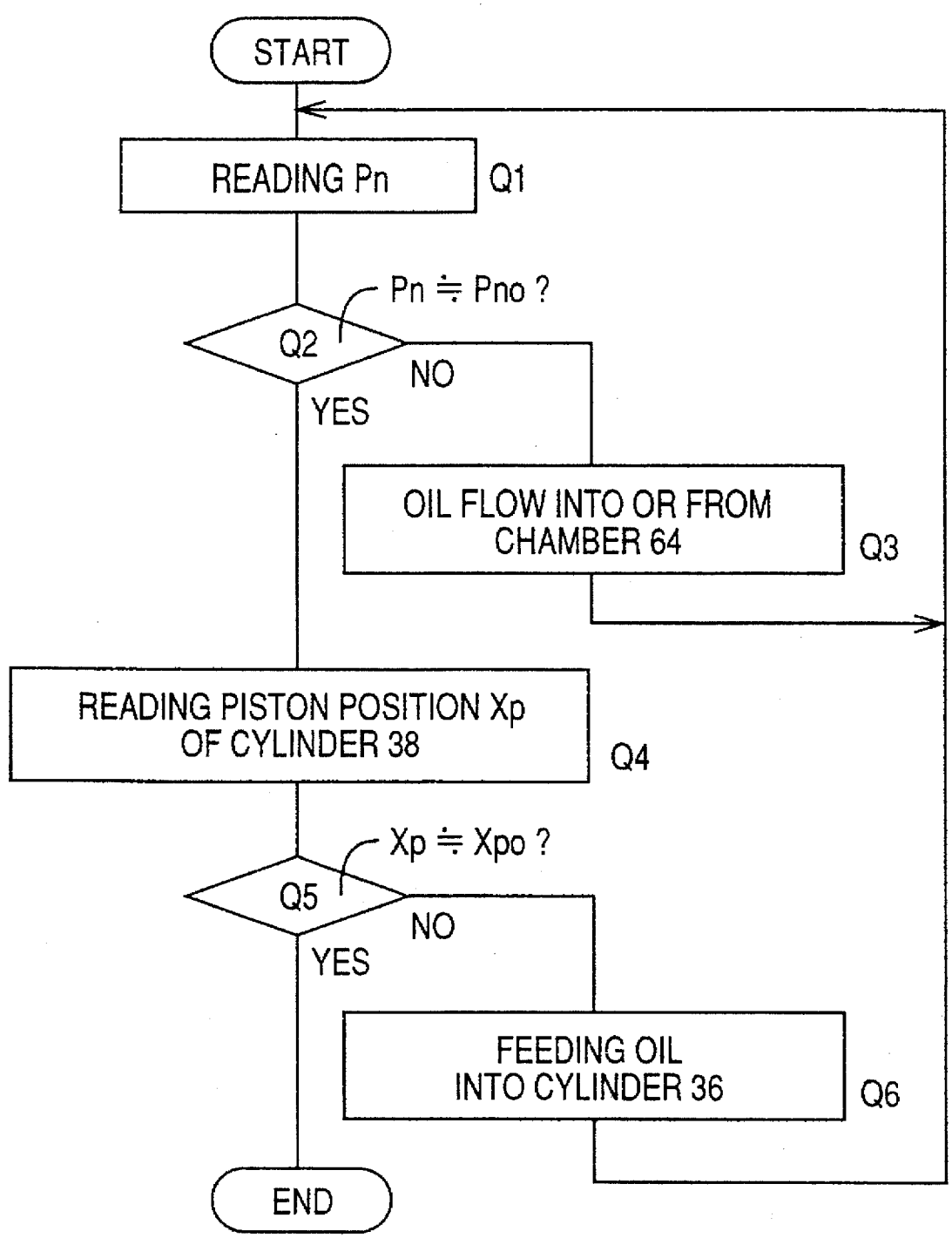
FIG. 11 is a flow chart illustrating an initializing operation of the press of FIG. 10 performed prior to a pressing cycle on a blank.

The routine of FIG. 11 is started with step Q1 to read the oil pressure Pn as represented by the output signal of the oil pressure sensor 104. Then, step Q2 is implemented to determine whether the oil pressure Pn is almost or substantially equal to a predetermined initial value Pno, namely, whether the detected initial oil pressure Pn is held within a tolerable range. The initial value Pno is determined so as to have a relationship with an initial value Poo of the oil pressure Po, as expressed by an equation Pno·S3=Poo·S2. However, the oil pressure Pn detected by the oil pressure sensor 104 may be replaced by the oil pressure Po detected by the oil pressure sensor 80. In this case, the detected oil pressure Po is compared with the initial value Poo. If a negative decision (NO) is obtained in step Q2, that is, the detected oil pressure Pn is different from the predetermined initial value Pno, the control flow goes to step Q3 to open the shut-off valve 68 or 74 to feed or discharge the oil into or from the pilot chamber 64. The amount of the oil flow into or from the chamber 64 may be determined as a function of the error (Pn −Pno). However, the oil is fed or discharged by a predetermined constant amount. Steps Q1–Q3 are repeatedly implemented until the detected oil pressure Pn becomes almost equal to the predetermined initial value Pno, namely, until an affirmative decision (YES) is obtained in step Q2. It will be understood that a portion of the controller 76 assigned to implement steps Q1–Q3 constitutes means for adjusting the initial oil pressure Pno in the pilot chamber 64.

If the affirmative decision (YES) is obtained in step Q2, the control flow goes to step Q4 read the piston position Xp of the cylinder 38 as represented by the output signal of the piston position sensor 102. Step Q4 is followed by step Q5 to determine whether the piston position Xp is almost the same as a predetermined initial position Xpo, namely, whether the initial position Xp of the piston 48 is in a tolerable range. This step Q5 is provided to check if there exists an oil leakage from the hydraulic circuit communicating with the second pressure chambers 34, which causes a change in the initial total oil volume Vo. A portion of the controller 76 assigned to implement steps Q4 and Q5 constitutes means for detecting the oil leakage associated with the second pressure cheers 34 of the hydro-pneumatic cylinders 26.

If the initial position Xp of the piston 48 is in the tolerable range, namely, if the affirmative decision (YES) is obtained in step Q5, one cycle of execution of the routine of FIG. 11 is terminated. If the negative decision (NO) is obtained in step Q5, the control flow goes to step Q6 to operate the pump 108 for a predetermined length of time for feeding the oil from the reservoir 106 into the volume compensating cylinder 36, and the routine is again executed. Step Q6 may be adapted to first calculate the amount of the oil to be fed into the volume compensating cylinder 36, by multiplying the error (Xpo−Xp) of the piston position Xp by the pressure-receiving area S2 of the piston 48, and then operating the pump 108 until the calculated amount of the oil has been measured by a suitable flow meter. The press may be provided with suitable alarm means such as an alarm light, which is activated when the error (Xpo−Xp) is larger than a predetermined upper limit.

In the present fifth embodiment, the initializing routine of FIG. 11 is executed prior to a production run of the press 100, to feed or discharge the oil into or from the pilot chamber 64 for controlling the oil pressure Pn to the predetermined initial value Pno, and to diagnose the hydraulic circuit (associated with the second pressure chambers 34) for leakage of the oil by checking whether the piston position Xp of the cylinder 38 is almost the same as the predetermined initial position Xpo, for feeding the oil into the volume compensating cylinder 36 to move the piston 48 to the predetermined initial position XPo in the event of an oil leakage from the hydraulic circuit. Thus, the initial total oil volume Vo of the hydraulic circuit including the chambers 34 and the cylinders 36, 38, and the initial oil pressure Poo are maintained at the predetermined optimum values, even in the presence of some oil leakage from the hydraulic system. Therefore, the force f which determines the blank-holding force can be accurately controlled according to the predetermined optimum press load change pattern Fr, such that the force f varies with the piston displacements X1, X3 according to the above equation (6), and such that the amount of change $\Delta f$ of the force f and the amount of change $\Delta Po$ of the oil pressure Po depend on the optimum oil flow amount $\Delta Vn$ which is calculated according to the above equation (1) or (13), as described above in detail.

Figure 12:
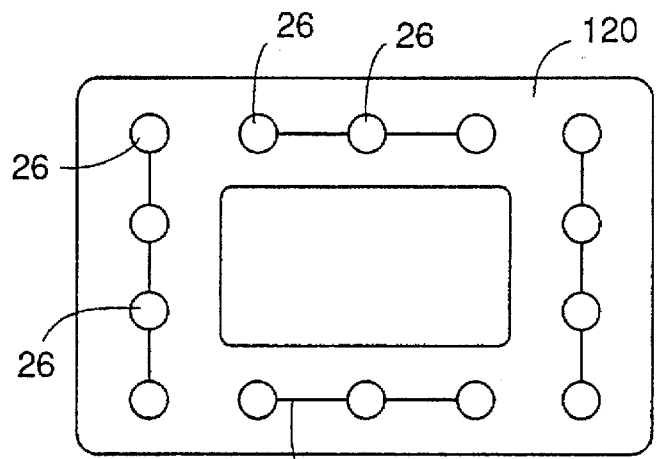
FIG. 12 is a view indicating an example of an arrangement of the cushioning cylinders which are classified into a plurality of independent groups corresponding to different areas of a pressure ring, according to a sixth embodiment of the invention.
Figure 13:
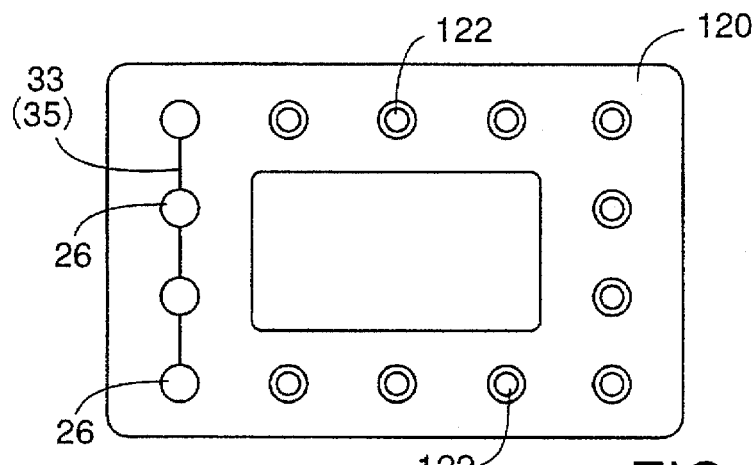
FIG. 13 is a view showing one arrangement of gas cylinders in addition to the cushioning cylinders, according to a seventh embodiment of the invention.
Figure 14:
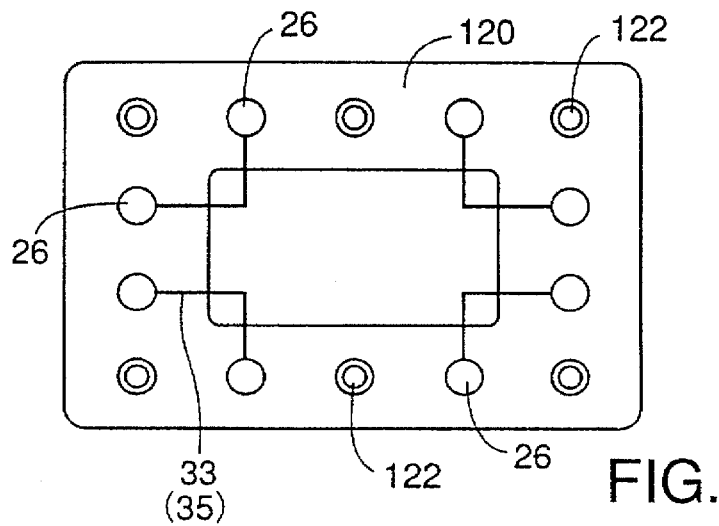
FIG. 14 is a view showing another arrangement of the gas cylinders, according to an eighth embodiment of the invention.

Referring to FIGS. 12–14, there are shown different arrangements of the cushioning cylinders in the form of the hydro-pneumatic cylinders 26, according to sixth, seventh and eighth embodiments of this invention. In these figures, reference numeral 120 denotes a pressure ring as viewed in the direction from the die 20 toward the punch 12. These figures show the positions of the hydro-pneumatic cylinders 26 as viewed in a plane parallel to the plane of the pressure ring 120.

In the arrangement of FIG. 12, the blank-holding surface of the pressure ring 120 is divided into a plurality of sections, depending upon the pressing condition such as the configuration of the product to be manufactured. In this example, the pressure ring 120 is divided into four sections, and the hydro-pneumatic cylinders 26 consist of four groups corresponding to the four sections of the pressure ring 120. The pressure regulating device 52, 92 is provided for each of the four groups of the cylinders 26. The cylinders 26 (pressure chambers 32, 34) in each group communicate with each other through the communication lines 33, 35, but do not communicate with the cylinders 26 in the other groups. The pressure regulating devices 52, 92 for the different groups of the cylinders 26 are controlled independently of each other, so that the blank-holding force is evenly distributed over the entire area of each section of the pressure ring 120. This arrangement permits independent and intricate adjustment of the local blank-holding forces in the different sections of the pressure ring 120, depending upon the specific configuration of the product, whereby the blank-holding force acting on one section of the pressure ring 120 may be different from that on the other sections. Accordingly, the quality of the product can be improved, and a relatively inexpensive low-quality material may be used as the blank 30.

In the arrangement of FIG. 13, a group of adjustable hydro-pneumatic cylinders 26 communicating with each other is provided in alignment with the left side portion of the pressure ring 120. These cylinders 26 are connected to the pressure regulating device 52, 92 for controlling the blank-holding force. Further, a plurality of non-adjustable gas cylinders 122 are provided corresponding to the other portions of the pressure ring 120. These gas cylinders 122 are not connected to the pressure regulating device 52, 92. For example, the left side portion of the pressure ring 120 corresponds to a front portion of a bonnet or food panel of an automobile, which front portion is formed by drawing.

In the arrangement of FIG. 14, the blank-holding surface of the pressure ring 120 is divided into a plurality of sections, for which respective groups of the adjustable hydro-pneumatic cylinders 26 are provided. The cylinders 26 in the same group communicate with each other as in the arrangement of FIG. 12. Further, a plurality of non-adjustable gas cylinders 122 are disposed evenly through the entire blank-holding surface of the pressure ring 120, as indicated in FIG. 14. These non-adjustable gas cylinders 122 are identical in structure with the adjustable hydro-pneumatic cylinders 26, but are different in operation and function from the cylinders 26. Namely, the second pressure chambers 34 of the gas cylinders 122 are not connected to the pressure regulating device 52, 92, and only the pressure of the gas in the first pressure chambers 32 contributes to the generation of the blank-holding force. Therefore, the blank-holding force generated by the gas cylinders 122 cannot be adjusted. The gas cylinders 122 and the corresponding cushion pins 24 are adapted to support the pressure ring 120 even when the force generated by the hydro-pneumatic cylinders 26 is zero. The number of the gas cylinders 122 is determined depending upon the force generating capacity of each cylinder 122.

Figure 15:
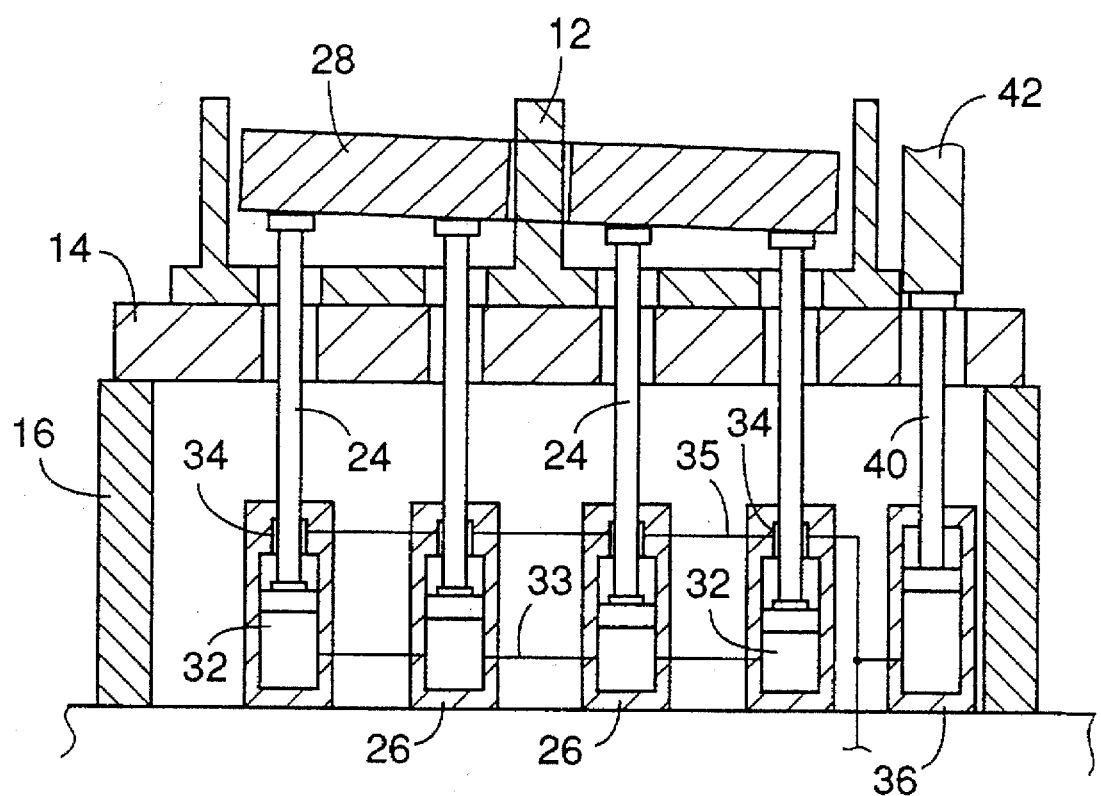
FIG. 15 is a view showing the press of FIG. 1 when oil flows into the cushioning cylinders are not synchronized.

In the arrangements of FIG. 13 and 14 according to the seventh and eighth embodiments of the invention, the pressure ring 120 can be lowered with the die 20, in close contact with the blank 30 under the biasing force of the gas cylinders 122, such that the pressure ring 120 is kept parallel with the die 20. This assures excellent holding of the blank 30 over the entire area of the pressure ring 120, without inclination of the pressure ring 120 as indicated in FIG. 15, which inclination may cause a failure of the pressure ring to correctly function. For example, the pressure ring 28 on the press 10 of FIG. 1 may be inclined due to different rates of the oil flows from the volume compensating cylinders 36 into the second pressure chambers 26 of the different hydro-pneumatic cylinders 26 when the piston rod 40 is lowered as a result of the downward movement of the press slide 22. Namely, the rate of flow of the oil into the pressure chamber 34 of the cylinder 26 nearest to the cylinder 36 is higher than those of the other cylinders 26. The provision of the non-adjustable gas cylinders 122 as in the embodiments of FIGS. 13 and 14 is effective to prevent such inclination of the pressure ring 120. In these embodiments, the gas cylinders 122 function as elastic members which are elastically contracted during a downward movement of the pressure ring 28 and provide a resistance to the downward movement of the pressure ring 30, so that the pressure ring is lowered in contact with the blank 30 in parallel with the die 20. Since the gas in the gas cylinders 122 have a lower modulus of elasticity of volume than a liquid used in a hydraulic cylinder, a variation of the forces generated by the different gas cylinders 122 due to a length variation of the corresponding cushion pins is comparatively small. It is desirable that the gas chambers of the gas cylinders 122 communicate with each other, so that the forces generated by the gas cylinders 122 are held constant even in the presence of the length variation of the cushion pins.

Figure 16:
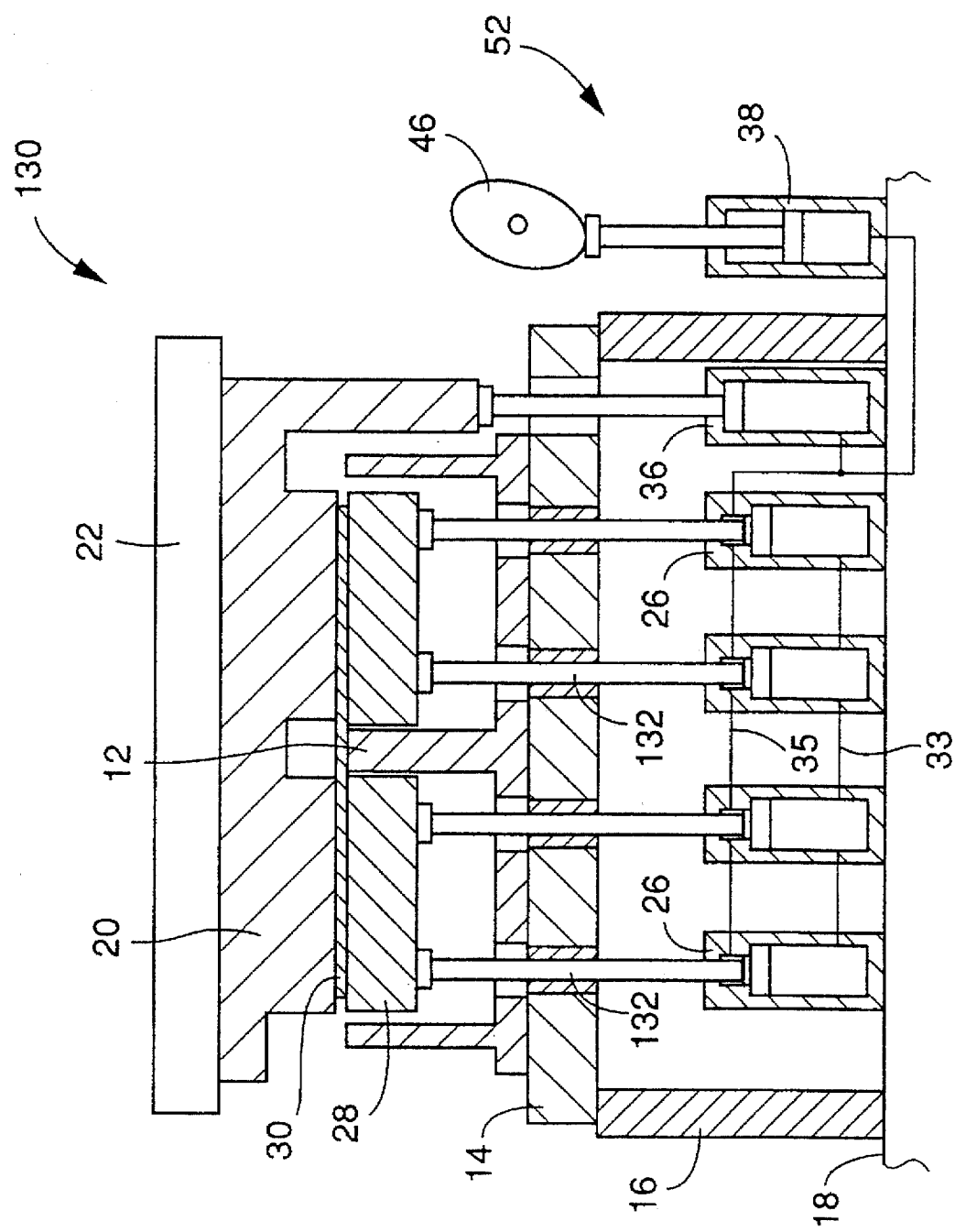
FIG. 16 is a schematic view showing a modification of the press of FIG. 1, wherein cushion pins are separate from the cushioning cylinders, according to a ninth embodiment of the invention.

Referring next to FIG. 16, there is shown a press 130 constructed according to a ninth embodiment of this invention, which is different from the press 60 of FIG. 1, in that cushion pins 132 used in the press 130 are separate from the piston rods of the hydro-pneumatic cylinders 26. In this embodiment, the cylinders 26 are disposed at predetermined positions on the base 18, so as to cover a sufficiently large area, and the cushion pins 132 are installed in abutting contact with the piston rods of selected ones of the cylinders 26. The cylinders 26 for which the cushion pins 132 are installed are selected depending upon the specific size and shape of the pressure ring 28. Since the force f as calculated according to the above equation (6) varies depending upon the number n of the cylinders 26 installed, different cams 46 having different profiles should be used to control the position of the piston 48 of the pressure adjusting cylinder 38 according a desired pattern following the optimum press load change pattern Fr. The appropriate one of the cams 46 is selected depending upon the number n of the cylinders 26 installed for the specific pressure ring 28. The cushion pins 132 may be used in the other embodiments such as the embodiment of FIG. 4.

Figure 10:
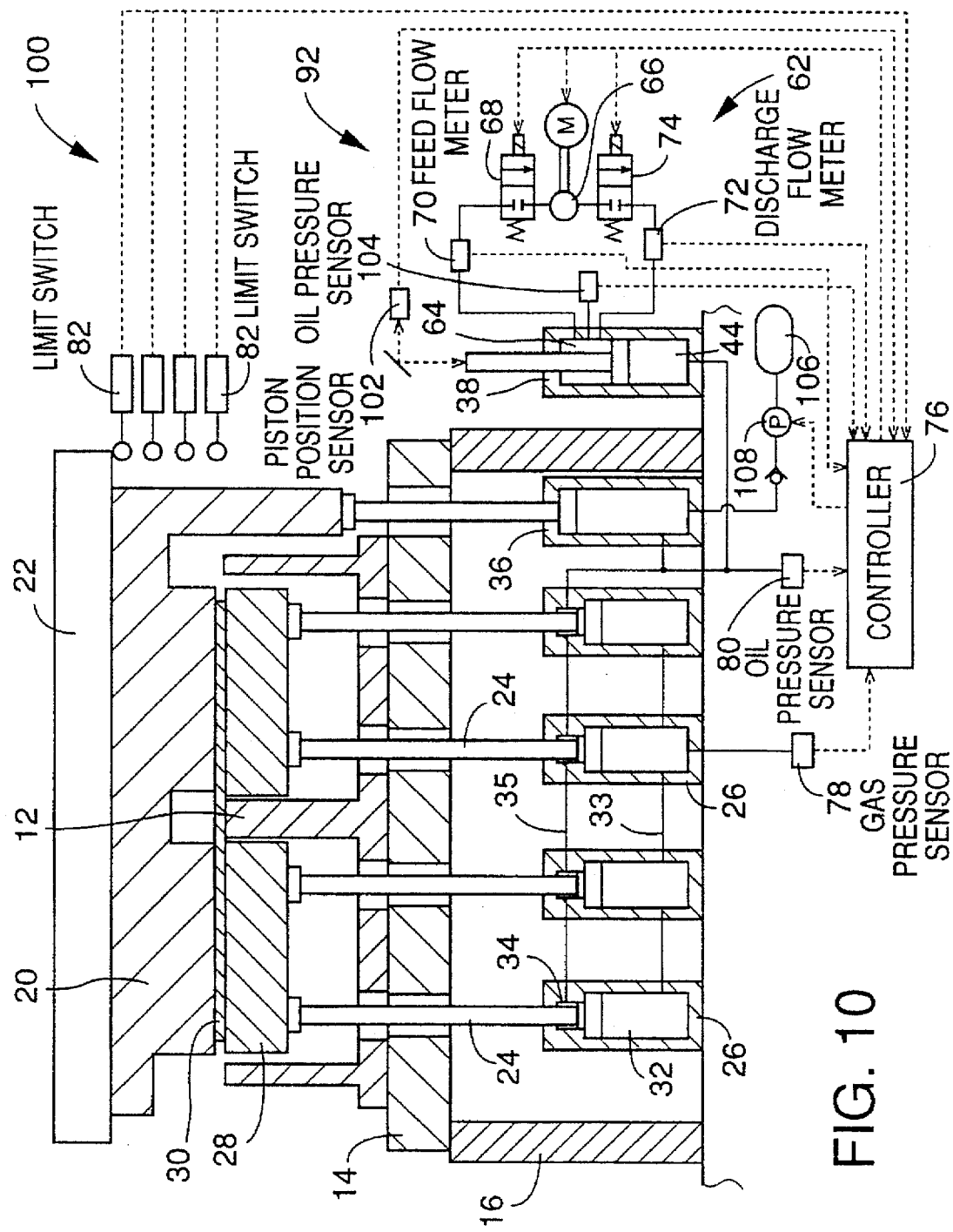
FIG. 10 is a schematic elevational view of a press constructed according to a fifth embodiment of the invention.
Figure 17:
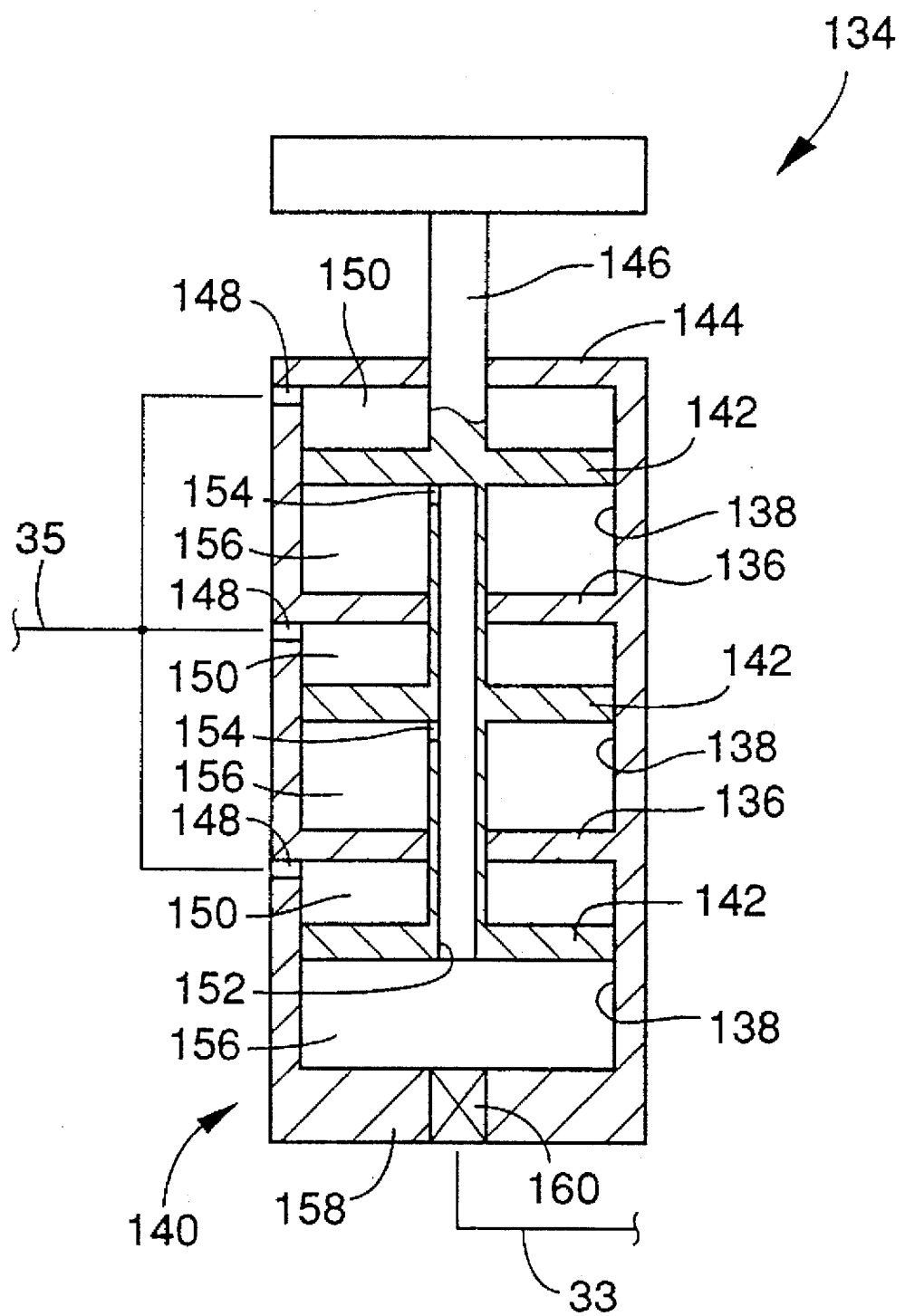
FIG. 17 is an elevational view showing one of cushioning cylinders used in place of the cushioning cylinders in the embodiment of FIG. 1 and the other embodiments, according to a tenth embodiment of the invention.

FIG. 17 shows a cushioning cylinder in the form of a hydro-pneumatic cylinder 134, which can be used in place of the hydro-pneumatic cylinders 26. The cylinder 134 has a cylinder housing 140 having three piston chambers 138, three pistons 142 slidably received in the respective piston chambers 138, and a piston rod 146 connected to the three pistons 142. The inner space of the housing 140 is divided by two partition walls 136 into the three piston chambers 138 such that these chambers 138 are arranged in the axial direction of the cylinder housing 140. The piston rod 146 extends through an upper wall 144 of the housing 140 and the two partition walls 136, and is axially movable together with the pistons 142 as a unitary member. The piston rod 146 may be formed integrally with the cushion pin 24 as in the embodiments of FIGS. 1, 4 and 10, or as a member separate from the cushion pin 132 as in the embodiment of FIG. 16. Each piston chamber 138 is divided by the piston 142 into a lower first pressure chamber 156 and an upper second pressure chamber 150. The cylinder housing 140 has three through-holes 148 which communicate with the second pressure chambers 150 of the respective piston chambers 138 and which are connected to the oil communication line 35 connected to the cylinders 36, 38. On the other hand, the piston rod 146 has an axial center hole 152 which is open at one end thereof to the first pressure chamber 156 of the lowermost piston chamber 138. The piston rod 146 has two radial communication holes 154 which communicate with the axial center hole 152 and the first pressure chambers 156 of the uppermost and intermediate piston chambers 138. Thus, the first pressure chambers 156 of the three piston chambers 138 communicate with each other through the center hole 152 and radial communication holes 154. The cylinder housing 140 has a lower wall 158 having a port 160 which communicates with the first pressure chamber 156 of the lowermost piston chamber 138. The port 160 is connected to the gas communication line 33.

In the hydro-pneumatic cylinder 134, the total pressure-receiving area Sg is 3×SP1, where "SP1" represents the pressure receiving area of each piston 142 on the side of the first pressure chamber 156. Accordingly, the total pressure receiving area Sg can be made sufficiently large to provide a sufficiently large blank-holding force, while at the same time the diameter of the cylinder 134 can be made relatively small to reduce the required installation space of the cylinder 134. The cylinder 134 also assures intricate distribution control of the blank holding force. The hydro-pneumatic cylinder 134 can be used as the gas cylinder 122 if the second pressure chambers 150 are exposed to the atmosphere through the through-holes 148.

While the present invention has been described above in detail in its presently preferred embodiments by reference to the drawings, for illustrative purpose only, it is to be understood that the invention may be embodied with various changes, modifications and improvements, which may occur to those skilled in the art, in the light of the foregoing teachings.

What is claimed is:

1. A press having a vertically reciprocable die, a stationary punch disposed below said die, and a pressure member disposed adjacent said punch such that said pressure member is vertically movable relative to said punch, said die and said punch cooperating with each other to perform a pressing operation on a blank placed on said pressure member as said die is lowered relative to said punch while said blank is held by and between said die and said pressure member, said press further comprising:

a plurality of cushion pins having upper ends to support said pressure member;

a plurality of cushioning cylinders associated with lower ends of said cushion pins and having pistons movable over a distance larger than an operating stroke of said pressure member during said pressing operation, each of said cushioning cylinders having a first pressure chamber and a second pressure chamber, both said first and second pressure chambers being isolated from atmospheric pressure, volumes of said first and second pressure chambers decreasing and increasing, respectively, as said cushion pins are lowered, said first and second pressure chambers containing fluid under respective first and second fluid pressures, said cushioning cylinders generating a blank-holding force which varies with a difference between said first and second fluid pressures, said blank-holding force being transmitted to said pressure member through said cushion pins to hold said blank; and pressure adjusting means for controlling at least one of said first and second fluid pressures to control said difference between said first and second fluid pressures for regulating said blank-holding force according to a predetermined optimum pattern of change of said blank-holding force as said pressure member is lowered during said pressing operation.

2. A press according to claim 1, wherein said first pressure chambers of at least two cylinders of said cushioning cylinders communicate with each other, and said second pressure chambers of at least two cylinders of said cushioning cylinders communicate with each other.

3. A press according to claim 1, wherein said first pressure chambers of said cushioning cylinders are filled with a gas, while said second pressure chambers of said cushioning cylinders are filled with an oil, said pressure adjusting means controlling pressures of said oil in said second pressure chambers, as said second fluid pressure.

4. A press according to claim 1, further comprising elastic members disposed below said pressure member and parallel to said cushioning cylinders, said elastic members being elastically contracted during a downward movement of said pressure member and provide a resistance to said downward movement of said pressure member to enable said pressure member to be lowered in close contact with said blank, while said pressure member is kept parallel with said die.

5. A press having a die and a punch, one of which is vertically reciprocable relative to the other, a pressure member vertically movable relative to said other of said die and said punch, said die and said punch cooperating with each other to perform a pressing operation on a blank placed on said pressure member as said one of said die and said punch is moved relative to said other of said die and said punch while said blank is held by and between said die and said pressure member, said press further comprising:

a plurality of cushion pins supporting said pressure member;

a plurality of cushioning cylinders associated with said cushion pins and each having a piston movable over a distance larger than an operating stroke of said pressure member during said pressing operation, each of said cushioning cylinders having a first pressure chamber and a second pressure chamber formed on opposite sides of said piston and having volumes which decrease and increase, respectively, as said cushion pins are moved with said pressure member in a direction toward said cushioning cylinders, both said first and second pressure chambers being isolated from atmospheric pressure, said first and second pressure chambers containing fluid under respective first and second fluid pressures, said cushioning cylinders generating a blank-holding force which varies with a difference between said first and second fluid pressures, said blank-holding force being transmitted to said pressure member through said cushion pins to hold said blank;

said first pressure chambers of at least two cylinders of said plurality of cushioning cylinders communicating with each other, said second pressure chambers of said at least two cylinders of said plurality of cushioning cylinders communicating with each other, so that said difference between said first and second fluid pressures of each of said at least two cylinders is the same as the difference between another of said at least two cylinders; and pressure adjusting means for controlling at least one of said first and second fluid pressures to control said difference between said said first and second fluid pressures for regulating said blank-holding force according to a predetermined optimum pattern of change of said blank-holding force as said pressure member is moved during said pressing operation.

6. A press according to claim 5, wherein said first pressure chambers of all of said plurality of cushioning cylinders communicate with each other while said second pressure chambers of all of said plurality of cushioning cylinders communicate with each other.

7. A press having a vertically reciprocable die, a stationary punch disposed below said die, and a pressure member disposed adjacent said punch such that said pressure member is vertically movable relative to said punch, said die and said punch cooperating with each other to perform a pressing operation on a blank placed on said pressure member as said die is lowered relative to said punch while said blank is held by and between said die and said pressure member, said press further comprising:

a plurality of cushion pins having upper ends to support said pressure member;

a plurality of cushioning cylinders associated with lower ends of said cushion pins and having pistons movable over a distance larger than an operating stroke of said pressure member during said pressing operation, each of said cushioning cylinders having a first pressure chamber and a second pressure chamber, volumes of said first and second pressure chambers decreasing and increasing, respectively, as said cushion pins are lowered, said first and second pressure chambers containing fluid under respective first and second fluid pressures, said cushioning cylinders generating a blank-holding force which varies with a difference between said first and second fluid pressures, said blank-holding force being transmitted to said pressure member through said cushion pins to hold said blank; and pressure adjusting means for controlling at least one of said first and second fluid pressures to control said difference between said first and second fluid pressures for regulating said blank-holding force according to a predetermined optimum pattern of change of said blank-holding force as said pressure member is lowered during said pressing operation, said pressure adjusting means comprising a pressure adjusting cylinder having a piston, and a pressure regulating chamber which is partially defined by said piston and which communicates with at least one of said first and second pressure chambers corresponding to said at least one of said first and second fluid pressures which is controlled according to said predetermined pattern of control;

load detecting means for detecting said blank-holding force during said pressing operation;

calculating means for obtaining a difference between the blank-holding force detected by said load detecting means and an optimum value as represented by said predetermined optimum pattern of change, and calculating an amount of change of a volume of said pressure regulating chamber necessary to change said blank-holding force by an amount equal to the obtained difference; and piston drive means for moving said piston of said pressure adjusting cylinder so as to change the volume of said pressure regulating chamber by the amount of change of the volume calculated by said calculating means.

8. A press according to claim 7, wherein said first pressure chambers of said cushioning cylinders are filled with a gas, while said second pressure chambers of said cushioning cylinders are filled with an oil, said pressure adjusting means controlling pressures of said oil in said second pressure chambers, as said second fluid pressure, and wherein said load detecting means includes a gas pressure sensor for detecting a gas pressure in said first pressure chambers, and an oil pressure sensor for detecting an oil pressure in said second pressure chambers, and wherein said pressure adjusting means further comprises pressure-receiving area determining means for determining a first pressure-receiving area of a piston of each of said cushioning cylinders which receives said gas pressure and a second pressure-receiving area of said piston of said each cushioning cylinder which receives said oil pressure, said pressure-receiving area determining means including a load sensor for detecting a load which acts on the press during a test pressing operation, said pressure-receiving area determining means determining said first and second pressure-receiving areas according to a predetermined relationship between the load detected by said load sensor during said test pressing operation and said gas and oil pressures detected by said gas and oil pressure sensors during said test pressing operation, said pressure adjusting means storing in a memory the first and second pressure-receiving areas which have been determined by said pressure-receiving area determining means, said load detecting means calculating said blank-holding force on the basis of said gas and oil pressures detected during said pressing operation on said blank, and said first and second pressure-receiving areas stored in said memory.

9. A press according to claim 7, wherein said first pressure chambers of said cushioning cylinders are filled with a gas, while said second pressure chambers of said cushioning cylinders are filled with an oil, said pressure adjusting means controlling pressures of said oil in said second pressure chambers, as said second fluid pressure, and wherein said pressure adjusting cylinder of said pressure adjusting means has a pilot chamber which is partially defined by said piston and which is separated from said pressure regulating chamber by said piston, said pilot chamber being filled with an oil, said piston drive means including a pressure regulating device for controlling flows of the oil into and from said pilot chamber, to thereby move said piston for changing the volume of said pressure regulating chamber, said press further comprising:

an oil pressure sensor for detecting a pressure of the oil in said pilot chamber or said pressure regulating chamber;

initial pressure adjusting means for adjusting said pressure regulating device, prior to said pressing operation on said blank, such that the pressure of the oil detected by said oil pressure sensor is equal to a predetermined optimum value;

a piston position sensor for detecting a position of said piston of said pressure adjusting cylinder; and oil leakage detecting means for detecting a leakage flow of the oil from a hydraulic circuit including said second pressure chambers of said cushioning cylinders, by determining whether the position of said piston detected by said piston position sensor substantially coincides with a predetermined initial position, while the pressure of the oil detected by said oil pressure sensor is adjusted to said predetermined optimum value by said initial pressure adjusting means.

* * * * *